(12) United States Patent
Wilcock et al.

(10) Patent No.: US 8,312,419 B2
(45) Date of Patent: Nov. 13, 2012

(54) AUTOMATED LIFECYCLE MANAGEMENT OF A COMPUTER IMPLEMENTED SERVICE

(75) Inventors: Lawrence Wilcock, Malmesbury (GB); Nigel Edwards, Bristol (GB); Guillaume Alexandre Belrose, Marlborough (GB); Jerome Rolia, Kanata (CA); Johannes Kirschnick, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 976 days.

(21) Appl. No.: 12/261,324

(22) Filed: Oct. 30, 2008

(65) Prior Publication Data
US 2010/0115490 A1 May 6, 2010

(51) Int. Cl.
*G06F 9/44* (2006.01)
(52) U.S. Cl. .................................. 717/104
(58) Field of Classification Search .............. 717/104
See application file for complete search history.

(56) References Cited

U.S. PATENT DOCUMENTS

| 6,336,138 | B1 | 1/2002 | Caswell et al. | |
|---|---|---|---|---|
| 6,405,364 | B1 | 6/2002 | Bowman-Amuah | |
| 6,928,637 | B2 | 8/2005 | Leherbauer | |
| 7,051,071 | B2 | 5/2006 | Stewart et al. | |
| 7,065,740 | B2 * | 6/2006 | Westerinen et al. | 717/101 |
| 7,155,664 | B1 | 12/2006 | Lee et al. | |
| 7,239,311 | B2 | 7/2007 | Dunn et al. | |
| 7,428,723 | B2 * | 9/2008 | Greene et al. | 717/103 |
| 7,814,459 | B2 | 10/2010 | Behnen et al. | |
| 7,912,749 | B2 | 3/2011 | Wong et al. | |
| 2001/0044738 | A1 | 11/2001 | Elkin et al. | |
| 2001/0049595 | A1 | 12/2001 | Plumer et al. | |
| 2002/0026630 | A1 | 2/2002 | Schmidt et al. | |
| 2002/0111820 | A1 | 8/2002 | Massey | |
| 2002/0116083 | A1 * | 8/2002 | Schulze | 700/108 |
| 2002/0165745 | A1 * | 11/2002 | Greene et al. | 705/7 |
| 2003/0046639 | A1 | 3/2003 | Fai et al. | |
| 2003/0084156 | A1 | 5/2003 | Graupner et al. | |
| 2003/0177018 | A1 | 9/2003 | Hughes | |

(Continued)

FOREIGN PATENT DOCUMENTS

EP 1542123 6/2005

(Continued)

OTHER PUBLICATIONS

Eilam, T. et al., "Model-Based Automation of Service Deployment in a Constrained Environment", Tech. rep. RC23382, IBM, Sep. 2004.

(Continued)

*Primary Examiner* — Wei Zhen
*Assistant Examiner* — Junchun Wu

(57) ABSTRACT

A system for automated lifecycle management of a computer implemented service, according to requirements, having a service model (30) representing the service at a given development state in the lifecycle, and a transition model (70) representing allowed operations to change the service model to a different one of the development states of the service, according to the requirements, and the transition model having a transparent structure suitable for automated inspection of the allowed operations, and suitable for automated adaptation of the allowed operations. The service model can be developed to another of its states of development according to the transition model. This can help facilitate more automation of the service development than for example code in a closed and fixed form such as for example a compiled program for altering the service model. This in turn can enable more complex services to be developed, or reduce development costs.

20 Claims, 16 Drawing Sheets

U.S. PATENT DOCUMENTS

| | | | |
|---|---|---|---|
| 2003/0182461 A1 | 9/2003 | Stelting et al. | |
| 2004/0002891 A1 | 1/2004 | Chen et al. | |
| 2004/0003119 A1 | 1/2004 | Munir et al. | |
| 2004/0019688 A1 | 1/2004 | Nickerson et al. | |
| 2004/0034552 A1 | 2/2004 | Cole et al. | |
| 2004/0103396 A1 | 5/2004 | Nehab | |
| 2004/0143470 A1 | 7/2004 | Myrick et al. | |
| 2004/0148183 A1* | 7/2004 | Sadiq | 705/1 |
| 2004/0177335 A1 | 9/2004 | Beisiegel et al. | |
| 2004/0205691 A1 | 10/2004 | Poole et al. | |
| 2005/0055667 A1 | 3/2005 | Beringer et al. | |
| 2006/0161466 A1 | 7/2006 | Trinon et al. | |
| 2006/0271581 A1 | 11/2006 | Sanjar et al. | |
| 2007/0006218 A1 | 1/2007 | Vinberg et al. | |
| 2007/0033093 A1 | 2/2007 | Divine et al. | |
| 2007/0038756 A1 | 2/2007 | Waldorf et al. | |
| 2007/0067204 A1 | 3/2007 | Brown et al. | |
| 2007/0067756 A1 | 3/2007 | Garza | |
| 2007/0094306 A1 | 4/2007 | Kyriazakos | |
| 2007/0157165 A1 | 7/2007 | Kim | |
| 2007/0169100 A1 | 7/2007 | Chamberlain et al. | |
| 2007/0179828 A1 | 8/2007 | Elkin et al. | |
| 2007/0240047 A1 | 10/2007 | Kosov et al. | |
| 2007/0240112 A1* | 10/2007 | Haselden et al. | 717/121 |
| 2008/0027769 A1 | 1/2008 | Eder | |
| 2008/0059952 A1* | 3/2008 | Van Huben et al. | 717/120 |
| 2008/0103786 A1 | 5/2008 | Zhang et al. | |
| 2008/0127047 A1 | 5/2008 | Zhang et al. | |
| 2008/0312980 A1 | 12/2008 | Boulineau et al. | |
| 2009/0183141 A1* | 7/2009 | Tai et al. | 717/124 |
| 2009/0198537 A1 | 8/2009 | Brown et al. | |
| 2009/0313639 A1 | 12/2009 | Davis et al. | |
| 2010/0017694 A1 | 1/2010 | Wick et al. | |
| 2010/0030890 A1 | 2/2010 | Dutta et al. | |
| 2010/0115490 A1 | 5/2010 | Wilcock et al. | |

FOREIGN PATENT DOCUMENTS

| | | |
|---|---|---|
| EP | 1684170 | 7/2006 |
| EP | 1710744 | 10/2006 |
| GB | 2354862 | 4/2001 |
| GB | 2419701 | 5/2006 |
| GB | 2419703 | 5/2006 |
| WO | 01/38976 | 5/2001 |
| WO | 03/005167 | 1/2003 |
| WO | 2004/090684 | 10/2004 |
| WO | 2007/081406 | 7/2007 |

OTHER PUBLICATIONS

Eilam, T., et al., "Reducing the Complexity of Application Deployment in Large Data Centers," IFIP/IEEE Int'l. Symp. on Integrated Mgmt., 2005.

EP Search Report dated Apr. 27, 2011, EP Patent Application No. 07855293.2, filed Dec. 20, 2007.

Goldsack, P., et al., "The SmartFrod Configuration Management Framework", ACM's Operating Systems Review (OSR); Jan. 2009.

International Search Report and Written Opinion dated Aug. 25, 2008, Korean InPCT Patent Application No. PCT/US2007/088338 filed Dec. 20, 2007; Korean Intellectual Property Office.

Rolia, J., et al., "Adaptive Information Technology for Service Lifecycle Management", HP Laboratories Technical Report, 2008.

Office Action dated Jun. 20, 2012, U.S. Appl. No. 12/808,223, dated Jun. 16, 2010.

Office Action dated May 7, 2012, U.S. Appl. No. 11/741,878, filed Apr. 30, 2007.

\* cited by examiner

AUTOMATED LIFECYCLE MANAGEMENT OF A COMPUTER IMPLEMENTED SERVICE

RELATED APPLICATIONS

This application relates to the following applications: Ser. No. 12/261,346 filed on Oct. 30, 2008, titled "CHANGE MANAGEMENT OF MODEL OF SERVICE", (applicant reference number 200801919), and titled "AUTOMATED OPTIMISATION OF MODEL OF SERVICE"; Ser. No. 12/808,223 filed on Jun. 15. 2010, titled "INCORPORATING DEVELOPMENT TOOLS IN SYSTEM FOR DEPLOYING COMPUTER BASED PROCESS ON SHARED INFRASTRUCTURE"; Ser. No. 12/808,229 filed on Jun. 15, 2010, titled "MODEL BASED DEPLOYMENT OF COMPUTER BASED BUSINESS PROCESS ON DEDICATED HARDWARE"; PCT/US2007/088334 filed on Dec. 20, 2010, titled "VISUAL INTERFACE FOR SYSTEM FOR DEPLOYING COMPUTER BASED PROCESS ON SHARED INFRASTRUCTURE"; Ser. No. 12/808,231 filed on Jun. 15, 2010, titled "MODELLING COMPUTER BASED BUSINESS PROCESS FOR CUSTOMISATION AND DELIVERY"; Ser. No. 12/808,233 filed on Jun. 15, 2010, titled "MODELLING COMPUTER BASED BUSINESS PROCESS AND SIMULATING OPERATION"; Ser. No. 12/808,227 filed on Jun. 15. 2010, titled "AUTOMATED MODEL GENERATION FOR COMPUTER BASED BUSINESS PROCESS"; PCT/US2007/088338 filed on Dec. 20, 2007, titled "SETTING UP DEVELOPMENT ENVIRONMENT FOR COMPUTER BASED BUSINESS PROCESS"; and Ser. No. 11/741,878 filed on Apr. 30, 2007, titled "DERIVING GROUNDED MODEL OF BUSINESS PROCESS SUITABLE FOR AUTOMATIC DEPLOYMENT", all of which are hereby incorporated in reference in their entirety.

FIELD OF THE INVENTION

The invention relates to systems for automated lifecycle management of a computer implemented service, methods of providing such a service, methods of providing shared infrastructure for such a system and service, and to corresponding software.

BACKGROUND

Physical IT (information technology) infrastructures are difficult to manage. Changing the network configuration, adding a new machine or storage device are typically difficult manual tasks. This makes such changes expensive and error prone. It also means that the change can take several hours or days to take place, limiting the rate at which reconfiguration can take place to take account of changing business demands. Sometimes the reconfiguration can take months, as more equipment needs to be ordered before it can be implemented.

A physical IT infrastructure can have only one configuration at any one time. Although this configuration might be suitable for some tasks, it is typically sub-optimal for other tasks. For example, an infrastructure designed for running desktop office applications during the day may not be suitable for running complicated numerical analysis applications during the night. In a single physical IT infrastructure, separate tasks can interfere with each other. For example, it has been proposed to use spare compute cycles on desktops and servers to perform large scale computations: grid applications. One problem is how to isolate the network traffic, the data storage and processing of these computations from other tasks using the same infrastructure. Without isolation undesirable interference between the tasks is likely to occur rendering such sharing an unacceptable risk.

In most physical IT infrastructure, resource utilization is very low: 15% is not an uncommon utilization for a server, 5% for a desktop. This means that customers have purchased far more IT infrastructure than they need. HP's UDC (Utility Data Centre) has been applied commercially and addresses some of these problems, by automatic reconfiguration of physical infrastructure: processing machines, network and storage devices. This requires specialized hardware which makes it expensive. In addition in the UDC a physical machine can only ever be in a single physical infrastructure. This means that all programs running on that physical machine will be exposed to the same networking and storage environment: they can interfere with each other and the configuration may not be optimal for all programs. In UDC although a physical machine can be reassigned to different infrastructure instances, called farms, at different times, it can only be assigned to one farm, at any given moment: it is not possible to share a physical machine between farms. This limits the utilization that levels that can be achieved for the hardware, requiring the customer to purchase more hardware than is necessary.

Parts of the IT infrastructure can be offered as a service. Servers, storage, and networking can be offered by internal corporate IT providers or Internet service providers. Email, word processing, and other simple business applications are now offered by many providers. Other services can be more complex business applications that implement business processes such as customer relationship management, order and invoice processing, and supply chain management are also offered as a service for example and many others can be envisaged including online gaming, online retailing and so on. In principle any software can be offered as a service. Other examples include rendering of computer animation for movies, web applications, computer simulations of physical systems, and financial modelling.

A service can be offered in several ways. It can be a portal that is accessed via Web browsers, a Web service endpoint, or a combination of the two and can be provided over the internet, or intranets, using wired or wireless networks for example. In some cases services can implement business processes for small business or larger enterprise class customers. These customers may have thousands or more employees and thousands or millions of users or Web enabled devices that interact with their service. There are several actors that can participate in Software as a service (SaaS). Infrastructure providers provide the (typically shared) infrastructure, physical and virtual, for the operation of service instances. Service providers provide software that is packaged as a service. These service providers may be customers of the infrastructure providers. Software vendors create such software. End customers contract with an infrastructure provider or software provider to consume a service. A service implements business processes for customers. A Service instance provides the service to a customer. A service provider may have development, testing, and production instances of a service. The users of the service are employees, IT systems, Web enabled devices, or business partners of the customer. In some cases, the infrastructure provider, software provider, and software vendor are one entity.

Model-driven techniques have been considered by many researchers and exploited in real world environments. In general, the techniques capture information in models that can be used to automatically generate code, configuration information, or changes to configuration information. The goal of model-driven approaches is to increase automation and reduce the human effort and costs needed to support IT systems. Systems can have many aspect-specific viewpoints, e.g., functionality, security, performance, conformance, each with a model. The concept of viewpoints was introduced in the ODP Reference Model for Distributed Computing.

There are several different paradigms for how service instances can be rendered into shared resource pools. These can be classified as multi-tenancy, isolated-tenancy, and hybrid-tenancy. Multi-tenancy hosts many customers with one instance of a software service. Isolated-tenancy creates a separate service instance for each customer. A hybrid may share some portion of a service instance such as a database across many customers while maintaining isolated application servers. Multi-tenancy systems can reduce maintenance and management challenges for providers, but it can be more difficult to ensure customer specific service levels. Isolated-tenancy systems provide for greatest performance flexibility and greatest security, but present greater maintenance challenges. Hybrid-tenancy approaches have features of both approaches.

Rendering service instances into shared virtualized resource pools presents configuration, deployment and management challenges, and various approaches are known. The lifecycle of a service can include any or all of for example initial specification, through design, to deployment and eventual decommissioning. Each potential customer may have specific requirements for the service, both functional and non-functional. Services do not conform to a one size fits all approach. A service provider must be able offer multiple variants of a service, whose behaviour and design are targeted to the customer requirements. Service design is the process of creating not only an optimised hardware and software configuration, but also a specification of the appropriate service lifecycle behaviour that matches that configuration. The lifecycle behaviour such as how to adapt the service in response to given changes in environment or changes to requirements, is typically fixed at the outset.

A known example of model-based automation is Eilam et al. ("Model-Based Automation of Service Deployment in a Constrained Environment," T. Eilam et al., Tech. rep. RC23382, IBM, September 2004. and "Reducing the Complexity of Application Deployment in Large Data Centers," T. Eilam et al., IFIP/IEEE Int'l. Symp. on Integrated Mgmt., 2005.), who describe a system that matches distributed application network topologies to the infrastructure network topology that is available in the data centre. They use transformations on application topology models to transform the topology into something that matches what can be deployed using the data centre's infrastructure. The prototype they describe is only able to deal with network topology matching and management.

SUMMARY OF THE INVENTION

An object is to provide improved apparatus or methods. In one aspect the invention provides a system for automated lifecycle management of a computer implemented service, according to requirements, the system having a service model arranged to represent at least part of the service at a given development state in the lifecycle, and a transition model representing allowed operations to change the service model to a different one of the development states of the service, according to the requirements, and the transition model having a transparent structure suitable for automated inspection of the allowed operations, and suitable for automated adaptation of the allowed operations. A service model state manager is arranged to cause the service model to be developed to another of its states of development according to the transition model. This can help facilitate more automation of the service development than for example code in a closed and fixed form such as for example a compiled program for altering the service model, the code not being open to inspection and adaptation without expert human input. This in turn can enable more complex services to be developed, or reduce development costs for example. Also it can be easier to manage, in the sense of enabling more reuse of code, more human readability, and enable easier automated checks for inconsistencies, automated correction and adaptation to changes in service requirements for example.

Other aspects encompass parts of the system such as some of the software for the system and methods of using the system. The methods are intended to encompass cases where the system is partly or largely located outside the jurisdiction, yet the user is using the system and gaining the benefit, from within the jurisdiction. These and other aspects can encompass human operators using the system, to enable direct infringement or inducing of direct infringement in cases where the infringers system is partly or largely located remotely and outside the jurisdiction covered by the patent, as is feasible with many such systems, yet the human operator is using the system and gaining the benefit, from within the jurisdiction. Other advantages will be apparent to those skilled in the art, particularly over other prior art. Any of the additional features can be combined together, and combined with any of the aspects, as would be apparent to those skilled in the art. The embodiments are examples only, the scope is not limited by these examples, and many other examples can be conceived within the scope of the claims.

BRIEF DESCRIPTION OF THE FIGURES

Specific embodiments of the invention will now be described, by way of example, with reference to the accompanying Figures, in which.

DESCRIPTION OF SPECIFIC EMBODIMENTS

Figure 1:
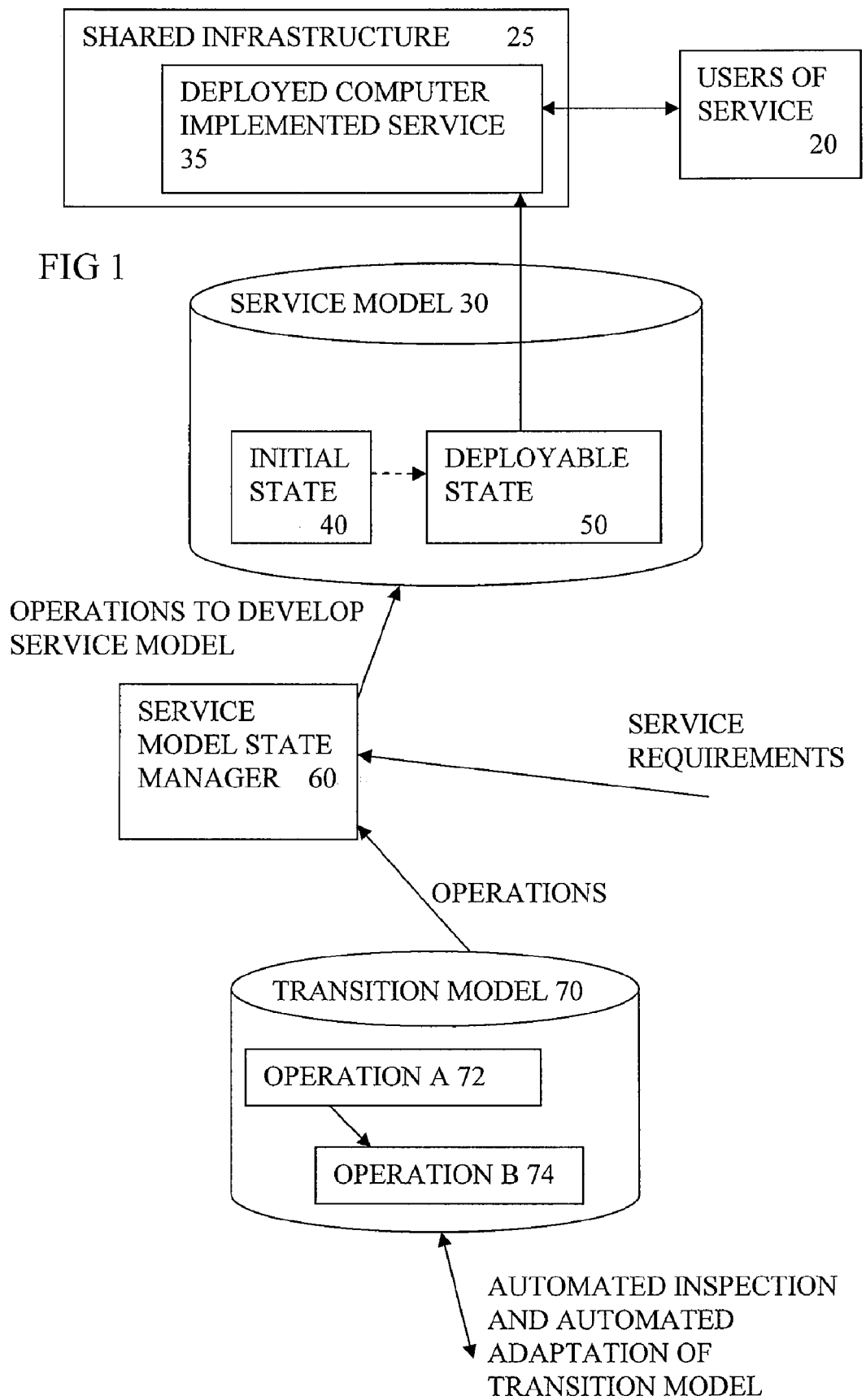
FIG. 1 shows a schematic view of a system according to an embodiment

Definitions:
"lifecycle" is defined as encompassing some or all stages of development of a service such as requirements collection, design, deployment, testing and run time management. Deployment is the process of instantiating and reifying a design of a service so that it can be made available to users.
"lifecycle management" can encompass management of part or all of the lifecycle.
"user" of a service can encompass a human user or another service.
"requirements" can include functional and non-functional requirements for a given service, and can alter during the lifecycle.
"model" is intended to encompass any kind of representation of a design and can encompass data structures, or code or combinations of these, for example, and can be made up of sub models located at different locations for example.
"state manager" is intended to encompass any kind of software, service, tool or process or combination of these, for managing the transition to another state, or causing it to be carried out. It can encompass software tools or any other mechanism for the execution of allowed operations according to the constraints defined by those allowed operations. The state manager may make use of tools to carry out the operations.
"allowed operations" can encompass any type of operation to cause changes to any part of a model, and can be allowed in the sense that an operation can be invoked, or that other checks on the operation are made and passed. Examples include checking parameters or default values for parameters are allowed, ranges or conditions on parameters are allowed, or that dependencies on other operations having been first carried out are fulfilled. It can encompass operations which are always allowed, or operations which are allowed under some circumstances, for example allowed for some users but not others. Operations can be allowed for a given entity in the model, or allowed for many entities, and can be allowed under given conditions.
"automated" is intended to cover completely autonomous action by software, or partial automation which involves proposing one or more actions and obtaining some input by a human operator, to make selections or authorisations for example.
"Functional requirements" can encompass what the service is intended to do, such as the business processes offered or other behaviours or functionality.
"operators" encompasses functions for invoking tools. Tools can perform analysis, modify the TM or SM, or collect requirements for example.
"automated inspection", and "automated adaptation" can encompass fully automated or partially automated actions, where partially automated encompasses having human input.
"parameters" for the operators encompasses parameters passed by the operators to the tools they invoke. Parameters can encompass any type of information that can modify the behaviour of the operation.
"execution constraints" can encompass for example preconditions on whether the operation is currently allowed (such as time of day restrictions), or restrictions on values of parameters used (such as ranges or combinations of values), and whether operations can or must occur in parallel or sequentially, and so on.
"non-functional requirements" can encompass how well the functional steps are achieved, in terms such as performance, security properties, cost, availability and others. It is explained in Wikipedia (http://en.wikipedia.org/wiki/Non-functional_requirements) for non-functional requirements as follows—"In systems engineering and requirements engineering, non-functional requirements are requirements which specify criteria that can be used to judge the operation of a system, rather than specific behaviors. This should be contrasted with functional requirements that specify specific behavior or functions. Typical non-functional requirements are reliability, scalability, and cost. Non-functional requirements are often called the ilities of a system. Other terms for non-functional requirements are "constraints", "quality attributes" and "quality of service requirements"."

Functional steps can encompass any type of function of the business process, for any purpose, such as interacting with an operator receiving inputs, retrieving stored data, processing data, passing data or commands to other entities, and so on, typically but not necessarily, expressed in human readable form.
"Deployed" is intended to encompass a modelled business process for which the computing infrastructure has been allocated and configured, and the software application components have been installed and configured ready to become operational. According to the context it can also encompass a business process which has started running.
"suitable for automated deployment" can encompass models which provide machine readable information to enable the infrastructure design to be deployed, and to enable the software application components to be installed and configured by a deployment service, either autonomously or with some human input guided by the deployment service.
"business process" is intended to encompass any process involving computer implemented steps and optionally other steps such as human input or input from a sensor or monitor for example, for any type of business purpose such as service oriented applications, for sales and distribution, inventory control, control or scheduling of manufacturing processes for example. It can also encompass any other process involving computer implemented steps for non business applications such as educational tools, entertainment applications, scientific applications, any type of information processing including batch processing, grid computing, and so on. One or more business process steps can be combined in sequences, loops, recursions and branches to form a complete Business Process. Business process can also encompass business administration processes such as CRM, sales support, inventory management, budgeting, production scheduling and so on, and any other process for commercial or scientific purposes such as modelling climate, modelling structures, or modelling nuclear reactions.

Figure 16:
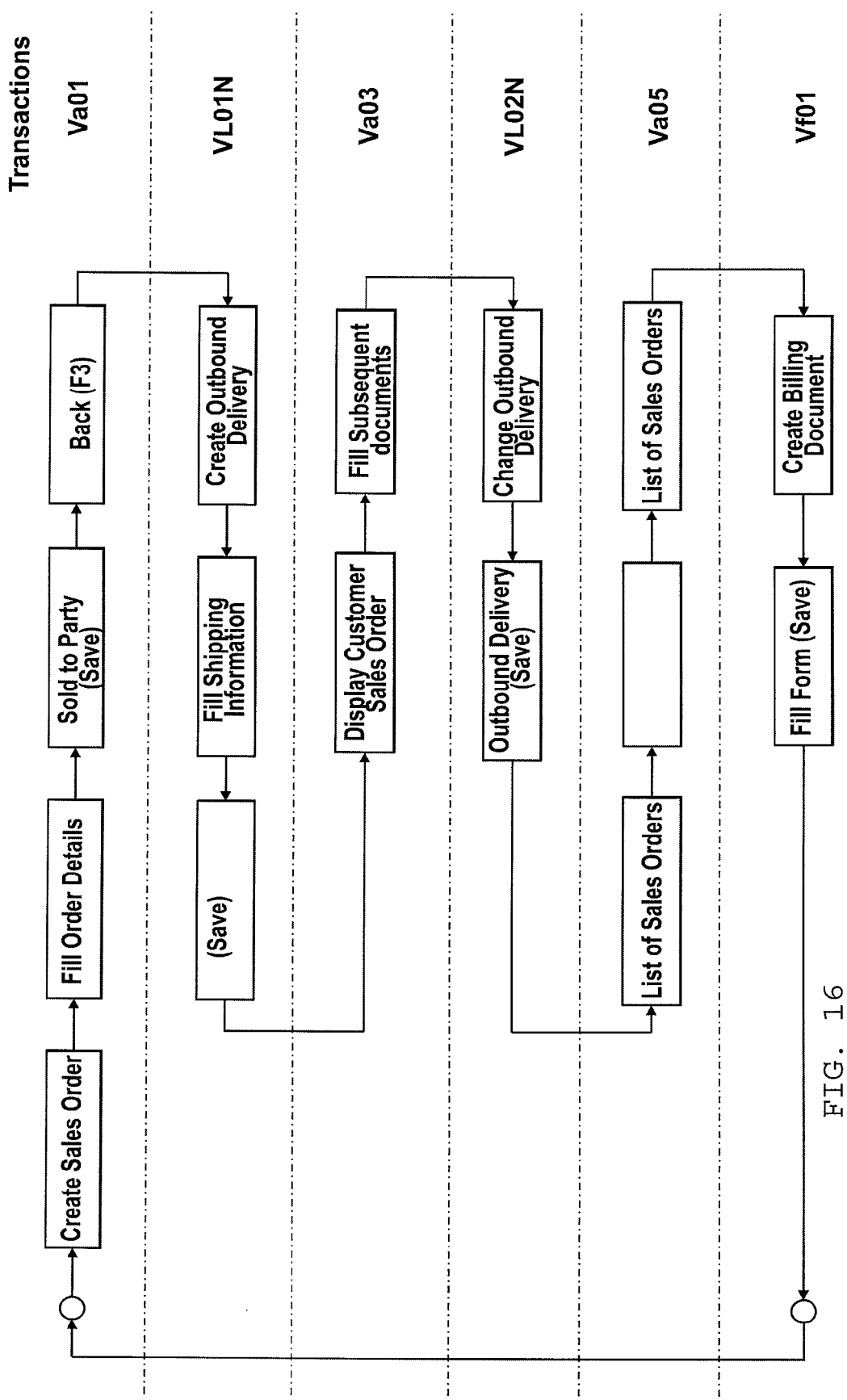
FIG. 16 shows an example of a design of a service in the form of a custom model of a business method known as a Sales and Distribution (SD) Benchmark produced by the company SAP, suitable for use with the STM of FIG. 15.

"application components" is intended to encompass any type of software element such as modules, subroutines, code of any amount usable individually or in combinations to implement the computer implemented steps of the business process. It can be code or data that can be manipulated to deliver a business process step (BPStep) such as a transaction or a database table. The Sales and Distribution (SD) product produced by SAP, and described below with reference to FIG. 16 is made up of a number of transactions each having a number of application components for example.

"unbound model" is intended to encompass software specifying in any way, directly or indirectly, at least the application components to be used for each of the computer implemented steps of the business process, without a complete design of the computing infrastructure, and may optionally be used to calculate infrastructure resource demands of the business process, and may optionally be spread across or contain two or more sub-models. The unbound model can also specify the types or versions of corresponding execution components such as application servers and database servers, needed by each application component, without specifying how many of these are needed for example.

"grounded model" is intended to encompass software specifying in any way, directly or indirectly, at least a complete design of the computing infrastructure suitable for automatic deployment of the business process. It can be a complete specification of a computing infrastructure and the application components to be deployed on the infrastructure.

"bound model" encompasses any model having a binding of the Grounded Model to physical resources. The binding can be in the form of associations between ComputerSystems, Disks, StorageSystems, Networks, NICS that are in the Grounded Model to real physical parts that are available in the actual computing infrastructure.

"infrastructure design template" is intended to encompass software of any type which determines design choices by indicating in any way at least some parts of the computing infrastructure, and indicating predetermined relationships between the parts. This will leave a limited number of options to be completed, to create a grounded model. These templates can indicate an allowed range of choices or an allowed range of changes for example. They can determine design choices by having instructions for how to create the grounded model, or how to change an existing grounded model.

"computing infrastructure" is intended to encompass any type of resource such as hardware and software for processing, for storage such as disks or chip memory, and for communications such as networking, and including for example servers, operating systems, virtual entities, and management infrastructure such as monitors, for monitoring hardware, software and applications. All of these can be "designed" in the sense of configuring and/or allocating resources such as processing time or processor hardware configuration or operating system configuration or disk space, and instantiating software or links between the various resources for example. The resources may or may not be shared between multiple business processes. The configuring or allocating of resources can also encompass changing existing configurations or allocations of resources. Computing infrastructure can encompass all physical entities or all virtualized entities, or a mixture of virtualized entities, physical entities for hosting the virtualized entities and physical entities for running the software application components without a virtualized layer.

"parts of the computing infrastructure" is intended to encompass parts such as servers, disks, networking hardware and software for example.

"server" can mean a hardware processor for running application software such as services available to external clients, or a software element forming a virtual server able to be hosted by a hosting entity such as another server, and ultimately hosted by a hardware processor.

"AIService" is an information service that users consume. It implements a business process.

"ApplicationExecutionComponent" is for example a (worker) process, thread or servlet that executes an Application component. An example would be a Dialog Work Process, as provided by SAP.

"ApplicationExecutionService" means a service which can manage the execution of ApplicationExecutionComponents such as Work Processes, servlets or data-base processes. An example would be an Application Server as provided by SAP. Such an application server includes the collection of dialog work processes and other processes such as update and enqueue processes.

"Application Performance Model" means any model which has the purpose of defining the resource demands, direct and indirect, for each Business process (BP) step. It could be used by an Application Performance Engine, and can be contained in the unbound model.

"Component Performance Model" can mean any model containing the generic performance characteristics for an Application Component. This can be used to derive the Application Performance Model (which can be contained in the unbound model), by using the specific Business process steps and data characteristics specified in the Custom Model together with constraints specified in the Application Constraints Model.

"Custom Model" means a customized general model of a business process to reflect specific business requirements.

"Deployed Model" means a bound model with the binding information for the management services running in the system.

"Candidate Grounded Model" can be an intermediate model that may be generated by a tool as it transforms the Unbound Model into the Grounded Model.

"Grounded Component" can contain the installation and configuration information for both Grounded Execution Components and Grounded Execution Services, as well as information about policies and start/stop dependencies.

"Grounded Execution Component" can be a representation in the Grounded Model of a (worker) process, thread or servlet that executes an Application Component.

"Grounded Execution Service" is a representation in the Grounded Model of the entity that manages the execution of execution components such as Work Processes, servlets or database processes.

"Infrastructure Capability Model" can be a catalogue of resources that can be configured by the utility such as different computer types and devices such as firewalls and load balancers.

"MIF (Model Information Flow)" is a collection of models used to manage a business process through its entire lifecycle.

The term "virtual" usually means the opposite of real or physical, and is used where there is a level of indirection, or some mediation between the resource user and the physical resource.

The distinctive features of the present invention can be applied to many areas, the embodiments described in detail can only cover some of those areas. The areas can encompass modelling dynamic or static systems, such as enterprise management systems, networked information technology systems, utility computing systems, systems for managing complex systems such as telecommunications networks, cellular networks, electric power grids, biological systems, medical systems, weather forecasting systems, financial analysis systems, search engines, and so on. The details modelled will generally depend on the use or purpose of the model. So a model of a computer system may represent components such as servers, processors, memory, network links, disks, each of which has associated attributes such as processor speed, storage capacity, disk response time and so on. Relationships between components, such as containment, connectivity, and so on can also be represented.

An object-oriented paradigm can be used, in which the system components are modeled using objects, and relationships between components of the system are modeled either as attributes of an object, or objects themselves. Other paradigms can be used, in which the model focuses on what the system does rather than how it operates, or describes how the system operates. A database paradigm may specify entities and relationships. Formal languages for system modelling include text based DMTF Common Information Model (CIM), Varilog, NS, C++, C, SQL, SmartFrog, Java, Groovy or graphically expressed based schemes.

Model Based Approach

A general aim of this model based approach is to enable development and management to provide matched changes to three main layers: the functional steps of the process, the applications used to implement the functional steps of the process, and configuration of the computing infrastructure used by the applications. Such changes are to be carried out automatically by use of appropriate software tools interacting with models modelling the above mentioned parts. Until now there has not been any attempt to link together tools that integrate business process, application and infrastructure management through the entire system lifecycle.

Model-Based technologies to automatically design and manage Enterprise Systems—see "Adaptive Infrastructure meets Adaptive Applications", by Brand et al, published as an external HP Labs Tech Report:
http://www.hpl.hp.com/techreports/2007/HPL-2007-138.html
and incorporated herein by reference, can provide the capability to automatically design, deploy, modify, monitor, and manage a running system to implement a business process, while minimizing the requirement for human involvement.

A model-based approach for management of such complex computer based processes will be described. Such models can have structured data models in CIM/UML to model the following three layers:

Infrastructure elements, such as physical machines, VMs, operating systems, network links.
Application elements, such as Databases, application servers.
Business level elements, such as functional steps of business processes running in the application servers.

A model is an organized collection of elements modelled in UML for example. A goal of some embodiments is to use these data models for the automated on-demand provision of enterprise applications following a Software as a service (SaaS) paradigm.

A model manager in the form of a Model-Based Design Service (MBDS) can be responsible for the creation of a set of models of the system, each with slightly different parameters for selection, configuration, and evaluation possibilities. The design process can be simply regarded as a search for and selection of the best model, usually in terms of finding the least expensive model which meets the functional and non-functional requirements of the system.

Lifecycle of the Service

Particularly for high end shared infrastructure examples supporting up to one million high value service instances, it is assumed that service providers specify their functional and non-functional requirements but it is the responsibility of the infrastructure provider to render to an appropriate software and infrastructure configuration for the service instance to meet these requirements, and to alter the service as these requirements change during the lifecycle of the service. Rather than the lifecycle (in terms of how to develop the service through its transitions from one development state to a next state) being a predetermined function of the requirements and environment, it is now recognised that this function can itself be adaptive, both to collected requirements and to analysis of how to meet those requirements. The definition of the lifecycle of a service can include the creation and adaptation of a service design that is optimised to meet customer requirements.

The model-based approach presented in the examples described below enables a high level of automation in service lifecycle management, but it is not an automation platform in itself. Rather, a service which is created and managed will typically leverage one or more automation platforms.

Service Design Process

The design of the hardware infrastructure and software landscape for large business processes such as enterprise applications is an extremely complex task, requiring human experts to design the software and hardware landscape. Once the enterprise application has been deployed, there is an ongoing requirement to modify the hardware and software landscape in response to changing workloads and requirements. This manual design task is costly, time-consuming, error-prone, and unresponsive to fast-changing workloads, functional requirements, and non-functional requirements. The embodiments describe mechanisms to automatically create an optimised design for an enterprise application, monitor the running deployed system, and dynamically modify the design to best meet the non-functional requirements.

There are two basic inputs to the design process:

Specification of functional requirements. Typically, this is in the form of a set of business steps that the application is to support. These describe what the system is intended to do from the perspective of end users. The specification will specify the set of standard business steps required from a standard catalogue, and any system-specific customisations of these steps. This specification will determine the set of products and optional components that must be included in the design of a suitable software landscape for the enterprise application.

Specification of non-functional requirements. This defines the requirements that the design must meet, such as performance, security, reliability, cost, and maintainability. Examples of performance could include the total and concurrent number of users to be supported, transaction throughput, or response times.

The design process involves the creation of a specification of the hardware and software landscape of the enterprise application that will meet the functional and non-functional requirements described above. This specification can consist of:
a). A set of physical hardware resources, selected from an available pool. The infrastructure would consist of computers, memory, disks, networks, storage, and other appliances such as firewalls.
b). A virtual infrastructure to be deployed onto the physical resources, together with an assigned mapping of virtual infrastructure to physical infrastructure. The virtual infrastructure must be configured in such a way to best take advantage of the physical infrastructure and support the requirements of the software running on it. For example, the amount of virtual memory or priority assigned to a virtual machine.
c). A selection of appropriately configured software components and services, distributed across the virtual and physical infrastructure. The software must be configured to meet the system specific functional requirements, such as customisations of standard business processes. Additionally, the software must be configured to best make use of the infrastructure it is deployed on, while meeting both the functional and non-functional requirements. Configuration parameters could include the level of threading in a database, the set of internal processes started in an application server, or the amount of memory reserved for use by various internal operations of an application server.

A design for an enterprise application can consist of:
a). Selection of appropriate quantities and types of physical and virtual infrastructure and software components, and
b). Configuration parameters for the infrastructure and software components and services.

Introduction to Embodiments of the Invention

Embodiments of the invention provide a mechanism to specify and automate the lifecycle behaviour of a service. The embodiments involve adaptively automating a service through some or all of its lifecycle. A typical lifecycle may include collection of service requirements, design of an appropriate hardware and software infrastructure to meet those requirements, through to deployment of the design to create a running service. By specifying the behaviour of the service lifecycle in a transition model associated with the service model, the service lifecycle becomes model-driven and the behaviour of the service can be updated at run-time. The service lifecycle behaviour encoded in the model can be adaptive to changes in the service requirements during the lifecycle, rather than being essentially predetermined at the outset.

Compared to the known example of model-base automation by Eilam et al. which is only able to deal with network topology matching and management, the embodiments described can handle lifecycle management such as: application configuration, infrastructure and application deployment, and can alter how the service is adapted in response to collected customer requirements. The model-based techniques can be applied to the management of the complete service lifecycle behaviour, for example from collection of customer requirements, through service design, to deployment of a running service. Some embodiments use a behaviour model to manage service lifecycle via the planning and application of Change Requests, which can apply changes to the behaviour model itself to adapt to service requirements. These embodiments can address or ameliorate such disadvantages as:

a) Hard coding of service lifecycle behaviour, typically in programmatic languages.
b) Lack of reuse of lifecycle behaviour between service types.
c) Lack of flexibility and run-time adaptability of behaviour to changing requirements.
d) The system being hard to maintain when supporting many service types.

As will be apparent from the examples described, at least some of the embodiments have a service model arranged to represent at least part of the service at a given development state in the lifecycle, and a transition model representing allowed operations to change the service model to a different one of the development states of the service, according to the requirements, and the transition model having a transparent structure suitable for automated inspection of the allowed operations, and suitable for automated adaptation of the allowed operations. A service model state manager can cause the service model to be developed to another of its states of development according to the transition model.

This use of a transition model setting out in an open and adaptable fashion how to change the service model can help facilitate more automation of the service development. More than for example code in a closed and fixed form such as for example a compiled program for altering the service model, the code not being open to inspection or adaptation without expert human input. This in turn can enable more complex services to be developed, or reduce development costs for example. Also it can be easier to manage, in the sense of enabling more reuse of code, more human readability, and enable easier automated checks for inconsistencies, automated correction and adaptation to changes in service requirements for example.

Additional Features

Some examples of additional features for dependent claims are as follows:

The transition model can also have a representation of how to adapt itself. This can result in the behaviour for how to adapt the lifecycle behaviour of the service itself being defined in the same model as the lifecycle behaviour. This means for example the representation in the transition model of the allowed operations, need not cover all conceivable circumstances, since some of those circumstances can be taken care of by defining how to adapt the representation to suit those circumstances. Thus more complex behaviours can be handled, or the transition model can be made simpler for a given complexity of behaviour. Such a unified solution can therefore be simpler to manage than where the allowed changes are obtained from elsewhere. Again this can enable more complex services to be managed more easily.

The transition model can further comprise a representation of how to get the requirements for use in developing the service. This can help make for a more unified solution able to both collect requirements and to adapt the service behaviour accordingly. By having these in the same model, the system can be made simpler and easier to manage, or enable more complex services to be handled.

The system can have one or more transition model tools arranged to analyse and adapt the allowed operations of the transition model according to the requirements. This can enable the system to adapt itself with less need for external input. Hence the operations need not be arranged to handle all conceivable circumstances, since some of those circumstances can be taken care of by defining how to adapt the representation to suit those circumstances. Thus more complex behaviours can be handled, or the transition model can be made simpler for a given complexity of behaviour. Thus the service model, and the development process can be made simpler, or made able to handle a wider range of possible service requirements.

The representation of the allowed operations can comprise operators arranged to invoke tools with given parameters. This can add a level of indirection compared to having the representation include instructions to carry out the allowed operations more directly. This can provide increased flexibility since the tools can be altered or inspected independently of the representation. It can enable more re-use of code and help enable the structure of the transition model to be transparent.

The transition model can have explicit encoding of execution constraints of the operators. Making this information explicit can assist in enabling automated tools to inspect the model to analyse it for checking or for adaptation for example.

The transition model tools can be arranged to add or include only allowed operations applicable to the requirements, or to remove allowed operations not applicable to the requirements. Consequently the adapted transition model can be maintained with fewer operations. Hence the transition model can be kept simpler and easier to analyse and adapt, as it can contain fewer behaviours for unmatched requirements. Or it can be made able to handle a wider range of such requirements for a given level of complexity.

The one or more transition model tools can be arranged to adapt the transition model to fully populate the transition model at the outset of the lifecycle. For the condition that all requirements can be ascertained at the outset, then a definition of the adaptation can be simpler and self contained if there is no need to augment the TM further during the development.

The service model can have an encoding of allowed operations associated with a given entity in the service model, and the system being arranged to check for inconsistency between the operations in the transition model relating to the given entity, and the corresponding allowed operations encoded in the service model for the same entity. This checking can help reduce errors, which can help reduce the need for expert human input and so reduce costs or enable greater complexity of services for example.

The transition model can have allowed operations relating to more than one transition between the states, and an identification of which allowed operation relates to which transition. This can help to modularise and compartmentalise the model and make it easier to analyse and adapt automatically.

The transition model can have explicit identification of allowed transitions of the states and preconditions for allowing transitions. This can make it easier to automate adaptation with lower risk of corrupted or incorrect operation of the service. By making this explicit rather than being implicit but buried in code, it can be easier for software tools to carry out programmatic analysis and adaptation of the transition model.

The transition model can have conditional statements to make the operations dependent on the requirements. This can help enable more automation of the adaptation of the service model to requirements, and help make the transition model more transparent and easier to maintain. The conditional statements can for example be in a structure of operators, within the operators, or within a specification used by the operators for adapting the transition model.

The service model can have development states representing at least a design of the service, modelled configuration of software components to implement the service steps, and modelled infrastructure for running the software components. This can help provide a more complete model and so enables more predictable and reliable implementation.

The system can be arranged to deploy the service on shared virtualised infrastructure according to the service model. This can promote more efficient use of infrastructure resources.

In some embodiments, a method of automated lifecycle management of a computer implemented service, according to requirements can involve providing a service model arranged to represent at least part of the service at one or more states of the lifecycle, providing a transition model comprising a set of operators representing how to change the service model to a different one of the states of development of the service, according to the requirements, the operators having one or more parameters, and the model being arranged to be open to automated inspection of the operations it represents, and open to automated adaptation, and using a service model state manager to develop the service model to another of its states of development according to the corresponding operators of transition model.

In some embodiments a method of providing a computer implemented service can involve using a system for automated lifecycle management of the service, as set out above, and the method involving inputting service requirements, causing the service model state manager to develop the service model to a deployable state using the allowed operations represented in the transition model, and deploying the service according to the service model to make the service available to users.

An additional step in some embodiments is causing automated tools to inspect the transition model and check for errors. Another such additional feature is the transition model further comprising a representation of how to get the requirements for use in developing the service, and the method having the step of getting the requirements according to this representation. The transition model can also have a representation of how to adapt itself, and the method have the step of causing adaptation of the transition model according to this representation.

Where the representation of the allowed operations comprises operators arranged to invoke tools with given parameters, and the method can involve causing execution of a set of the operators to invoke corresponding ones of the tools.

The method can involve causing development of the service model through development states representing at least a design of the service, modelled configuration of software components to implement the service steps, and modelled infrastructure for running the software components.

Where the service model has an encoding of allowed operations associated with a given entity in the service model, and the method can involve causing a check for inconsistency between the operations in the transition model relating to the given entity, and the corresponding allowed operations encoded in the service model for the same entity.

Some embodiments can involve a method of providing shared infrastructure for service providers to use for providing a service, and providing a system for automated lifecycle management of the service as set out above and the method involving allowing the service provider to input service requirements, and to cause the service model state manager to develop the service model to a deployable state using the allowed operations represented in the transition model, and allowing the service provider to deploy the service on the shared infrastructure according to the service model to make the service available to users.

FIG. 1, A System According to an Embodiment

The embodiments described show mechanisms to specify and automate the lifecycle behaviour of a service. Some embodiments are capable of adaptively automating a service through its complete lifecycle. A typical lifecycle may include collection of service requirements, design of an appropriate hardware and software infrastructure to meet those requirements, through to deployment of the design to create a running service. It is assumed that management of the service is model-based. Management operations update a service model 30, an example of which is a Service Lifecycle Model (SLM), associated with a specific instance of the service. These updates to the service model may cause tools to perform actions on the system under management to change the state of the system to reflect the desired state described in the model.

Figure 10:
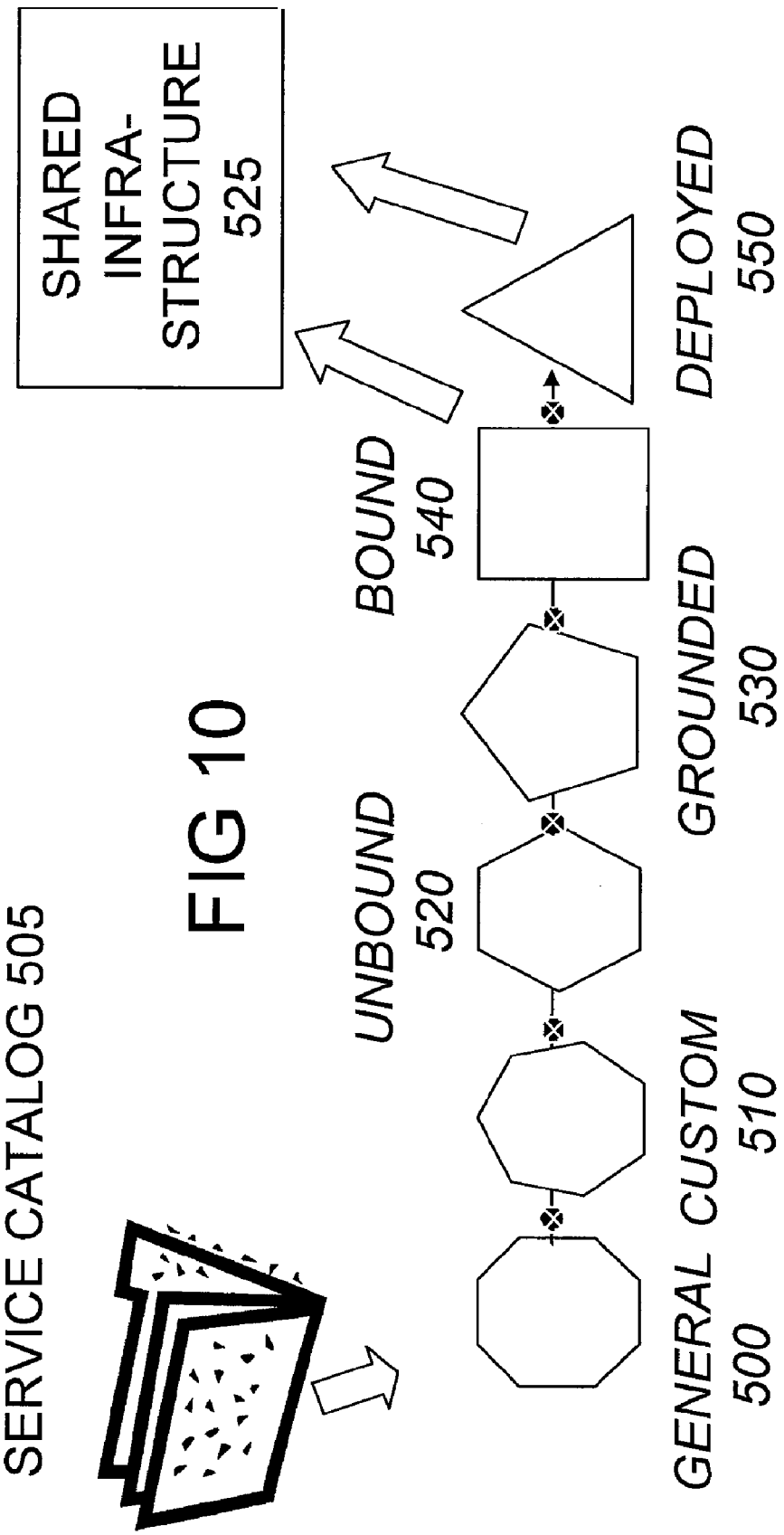
FIG. 10 shows a view of a sequence of development states of the service model according to an embodiment.

FIG. 1 shows a deployed computer implemented service 35 deployed on shared infrastructure 25 provided by an infrastructure provider. The deployed service is used by users 20. The deployed service is deployed according to the service model 30. This service model has a number of states of development. An initial state 40 and a deployable state 50 are shown as examples, other examples can be envisaged, and other examples are shown in FIG. 10 described below.

A service model state manager 60 is provided to manage the development of the service model through its lifecycle. An example of a component of this manager is a model lifecycle service (MLS). The manager can comprise software tools, or can make use of such tools from external sources to carry out the development, in a partially or fully automated manner. The manager runs the development according to allowed operations held in the transition model 70, and according to service requirements. This transition model is arranged to be open to automated inspection and automated adaptation. The requirements can be specified at the outset by the service provider and may be updated during the lifecycle.

Some features of the embodiments are first briefly introduced here, then described in more detail with reference to the figures:

A) Model-driven service lifecycle management. The behaviour of the service is itself specified in a transition model, and example of which is the Model State Transition (MST). An instance of the MST is associated with an instance of the SLM. The model-based nature of the specification can provide formalism, correctness checking, and adaptivity for service behaviour.

B) Controlled model changes. All service lifecycle management operations specified in the MST can be performed (in some cases exclusively) by a set of tools made available by the infrastructure provider in the form of a service execution platform. Changes to the service model and operations that affect realworld entities can be scheduled for example by the submission to a change management engine of a simple model, called a Change Request (CR), which encodes the required change. Change Requests provide a formal way to specify the invocation of a tool to carry out a change, specify preconditions on the applicability of the change, and control dependencies between changes.

Because CRs can also specify expected outcome, the effect of performing the specified lifecycle behaviour can be predicted and checked for correctness.

C) Automated planning and execution of service lifecycle. The MST specifies the required set of changes to the service model to progress the lifecycle. The MST is encoded in the form of a state machine, as sequences of parameterised CRs. The service model state manager, an example of which is an automated service, the Model Lifecycle Service (MLS), can perform a planning operation, searching through state-space to plan the best way to carry out the required change. All CRs in this "best way" are submitted to a Change Request Engine (CRE) that then automates the execution of the CRs.

D) Adaptive behaviour. CRs scheduled by the MLS can make changes to any part of the service model, access-rights permitting, including the MST itself. This allows the behaviour encoded in the MST to be updated at run time, for example to best meet changes to customer requirements.

Such changes can occur at any time in the lifecycle of the service. This allows not only customer specific definition or customisation of service behaviour during the service design phase, but also refinement of the behaviour of a deployed service.

The embodiments described do not assume any specific schema or structuring for the SLM. Instead a set of models and mechanisms to enable automated lifecycle management of the service model, and therefore the service itself are set out. Nevertheless, a specific structuring of the service model (SLM) for an embodiment of the invention will be outlined below with reference to FIG. 8.

Figure 2:
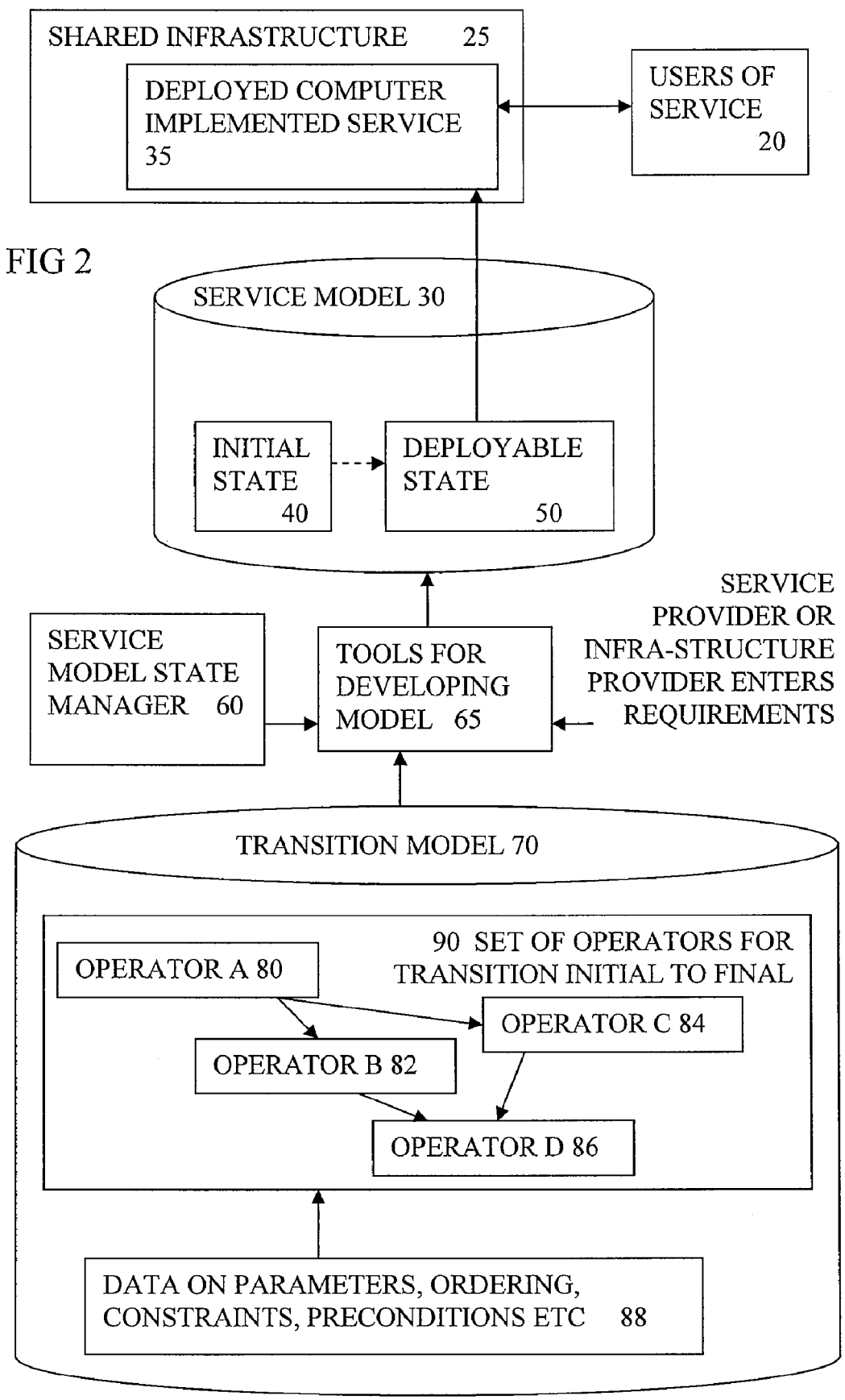
FIG. 2 shows another embodiment, having a set of operators, for invoking tools for developing the service model.

FIG. 2 Transition Model Having a Set of Operators, for Invoking Tools for Developing the Service Model FIG. 2 shows a similar arrangement to that of FIG. 1 and similar reference numerals are used as appropriate. In this case tools 65 for developing the service model are shown. These are invoked by a set 90 of operators in the transition model, the set forming a structured sequence of allowed operations for altering the state of the service model either to a next development state or in some cases to revert to a preceding state of development.

FIG. 2 shows an example of a structured set of operators, there may be many more in different sequences. Operator A 80 is followed by operator B 82 or operator C 84. The choice may be made by the service model state manager, or governed by service requirements for example. Either operator B or C is followed by operator D 86.

Executing each operator results in appropriate tools being invoked to carry out specified operations on the service model, according to data 88 in the transition model. The data can indicate parameters, ordering, constraints and preconditions and so on, for the given operator.

Figure 3:
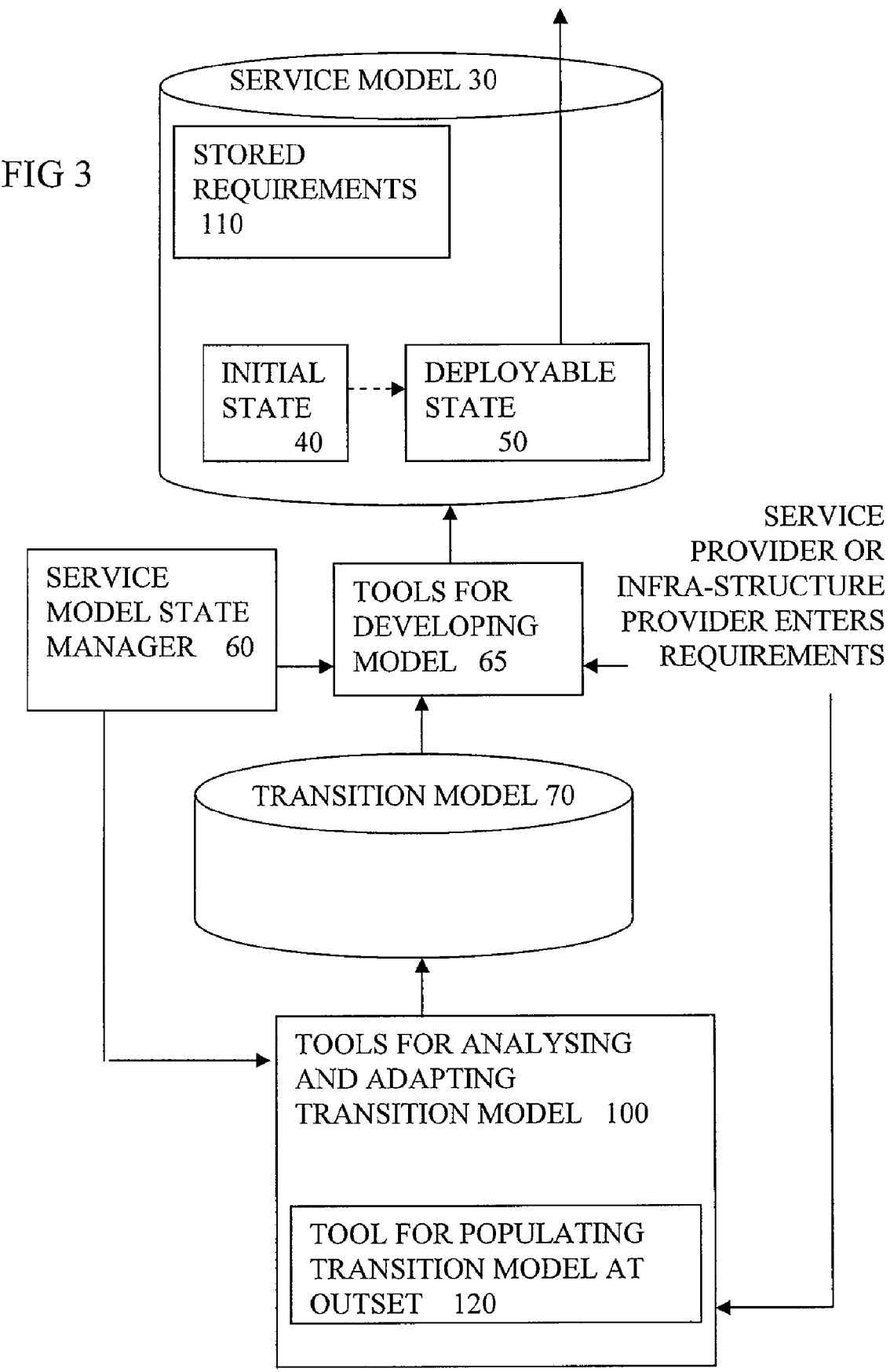
FIG. 3 shows another embodiment having tools for analysing and adapting the transition model.

FIG. 3 Tools for Analysing and Adapting the Transition Model

FIG. 3 shows a similar arrangement to that of FIG. 1 and similar reference numerals are used as appropriate. In this case tools 65 for developing the service model are shown. Also shown are tools 100 for analysing and adapting the transition model. These tools include a tool 120 for populating the transition model at the outset. These tools make use of the transition model being open to automated inspection and to automated adaptation. They are typically controlled by the service model state manager directly or indirectly. They may make use of service requirements as inputs, and make allowed changes to the transition model. By making the transition model adaptable, and restricting the adaptations, it becomes easier to make the development of the service model adaptable to a range of service requirements at various stages in the lifecycle, without needing to anticipate and set out all the possibilities explicitly in the service model for example.

Figure 4:
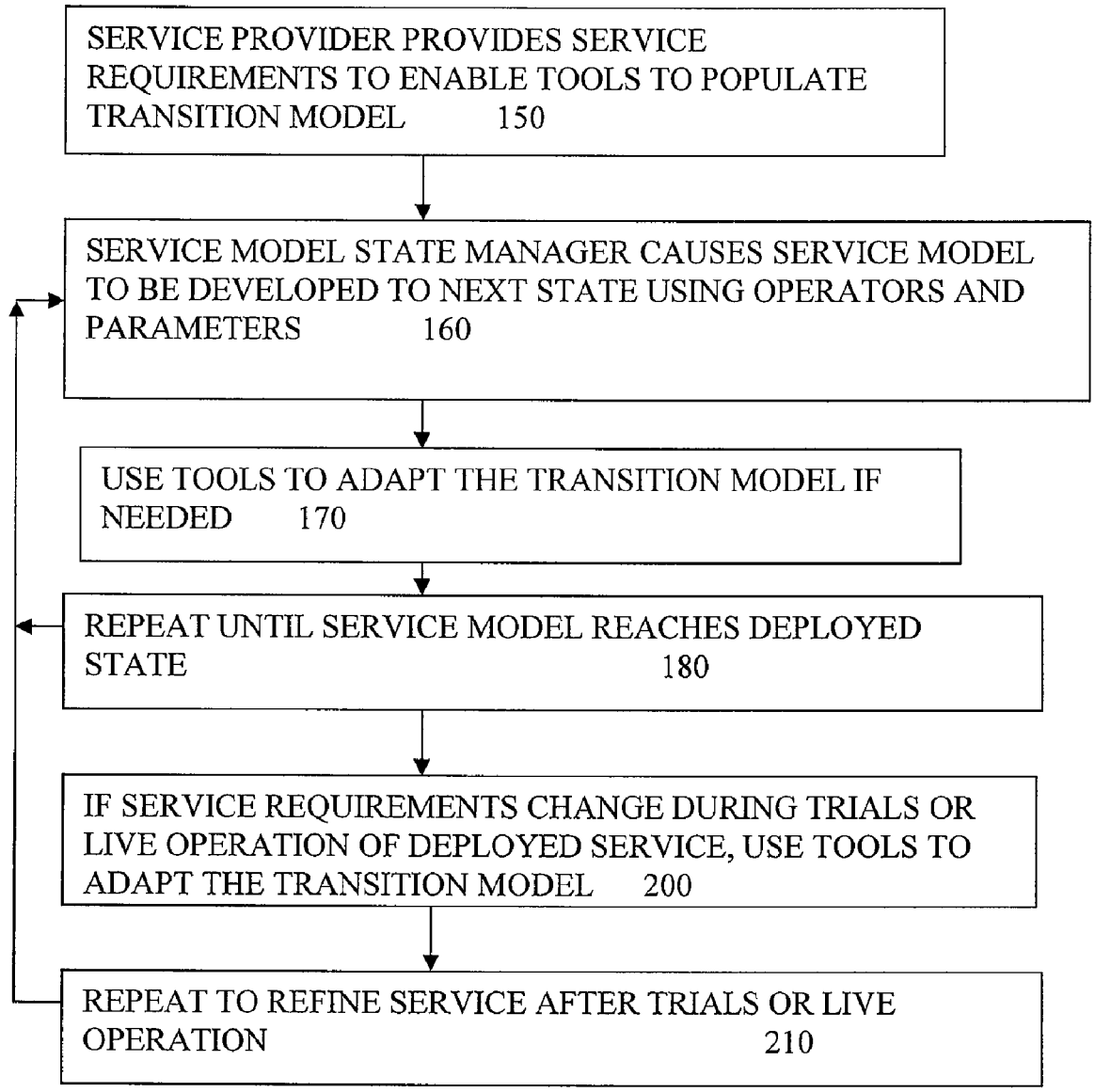
FIG. 4 shows steps of developing a service through states of its lifecycle.

FIG. 4 Steps of Developing a Service Through States of its Lifecycle

FIG. 4 shows a series of steps in the operation of the system of an embodiment. At step 150 a service provider provides service requirements to enable tools to populate the transition model. Then the service model state manager causes the service model to be developed to next state using operators and parameters from the transition model at step 160. These tools may themselves have been invoked by an allowed operation in the TM. At step 170, tools are used to adapt the transition model if needed, if requirements have changed for example. These steps are repeated until the service model reaches a deployed state at step 180. If service requirements change during trials or live operation of deployed service, tools are used to adapt the transition model at step 200. Steps 160 onwards can be repeated to refine the service after trials or live operation at step 210. The operations in the TM can operate on the system model, or the transition model or can operate on the system under management.

Figure 5:
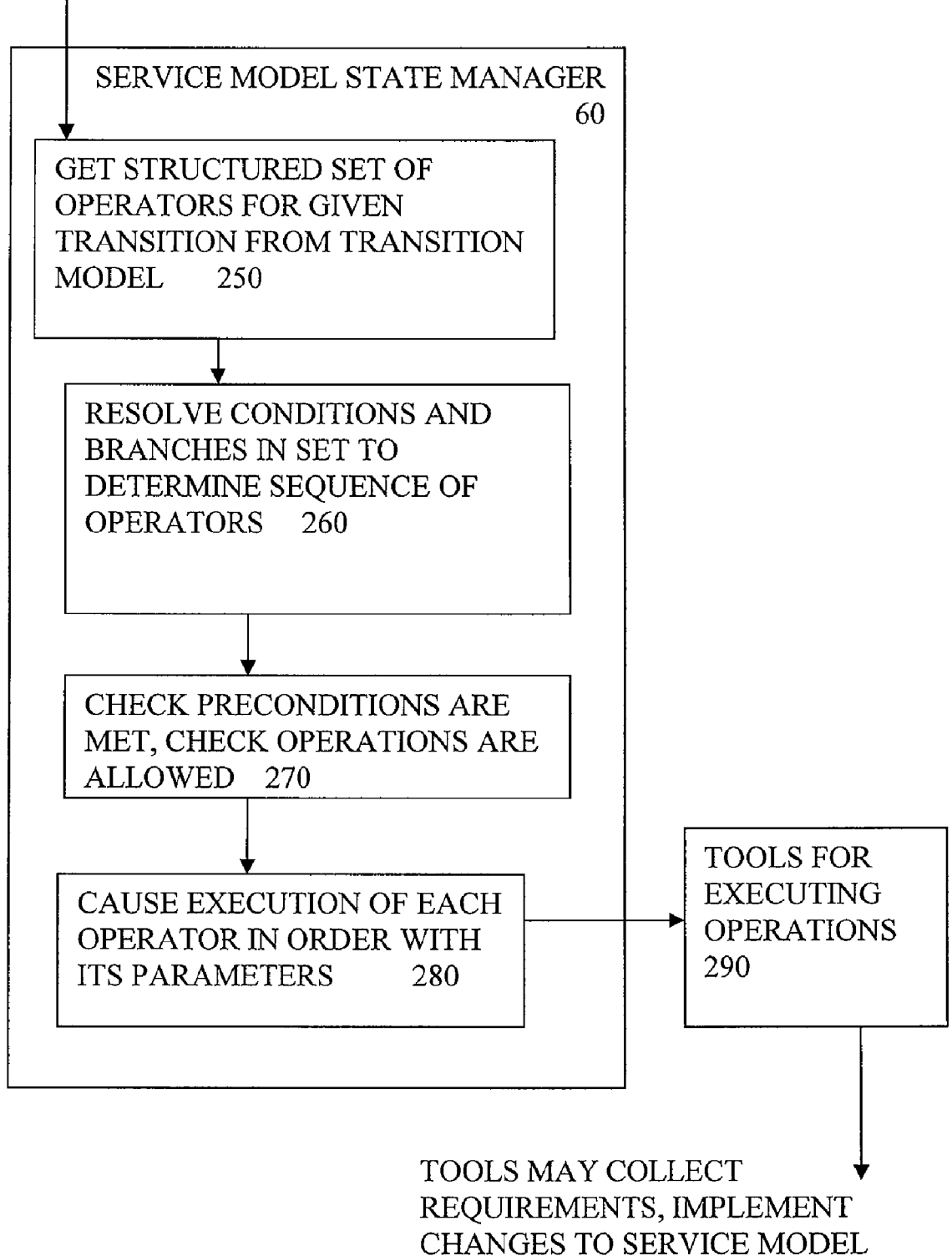
FIG. 5 shows an example of actions of a service model state manager according to an embodiment.

FIG. 5 Actions of a Service Model State Manager According to an Embodiment

FIG. 5 shows an example of some actions of a service model state manager for use in the embodiments set out above. Other examples could be envisaged. Following a request to change a state of the service model, at step 250 the manager gets a structured set of operators for the given transition from the transition model. The request could come from the service provider, or the manager could generate it once a previous development has been completed for example. At step 260, the manager resolves conditions or branches in the set to determine a sequence of operators. At step 270, the manager checks that any preconditions are met, and optionally checks the proposed operations are allowed. There are various possibilities for this where to check, for example the service model, or some external database may have information on what operations are allowed or not allowed for various reasons. At step 280, the manager can cause execution of each operator in order (such as sequential or parallel or combination of these), with any parameters. As shown, the operators may invoke tools 290 with given parameters, for executing the operations on the service model, or to collect requirements needed at that stage of development, or cause changes to the system under management.

Figure 6:
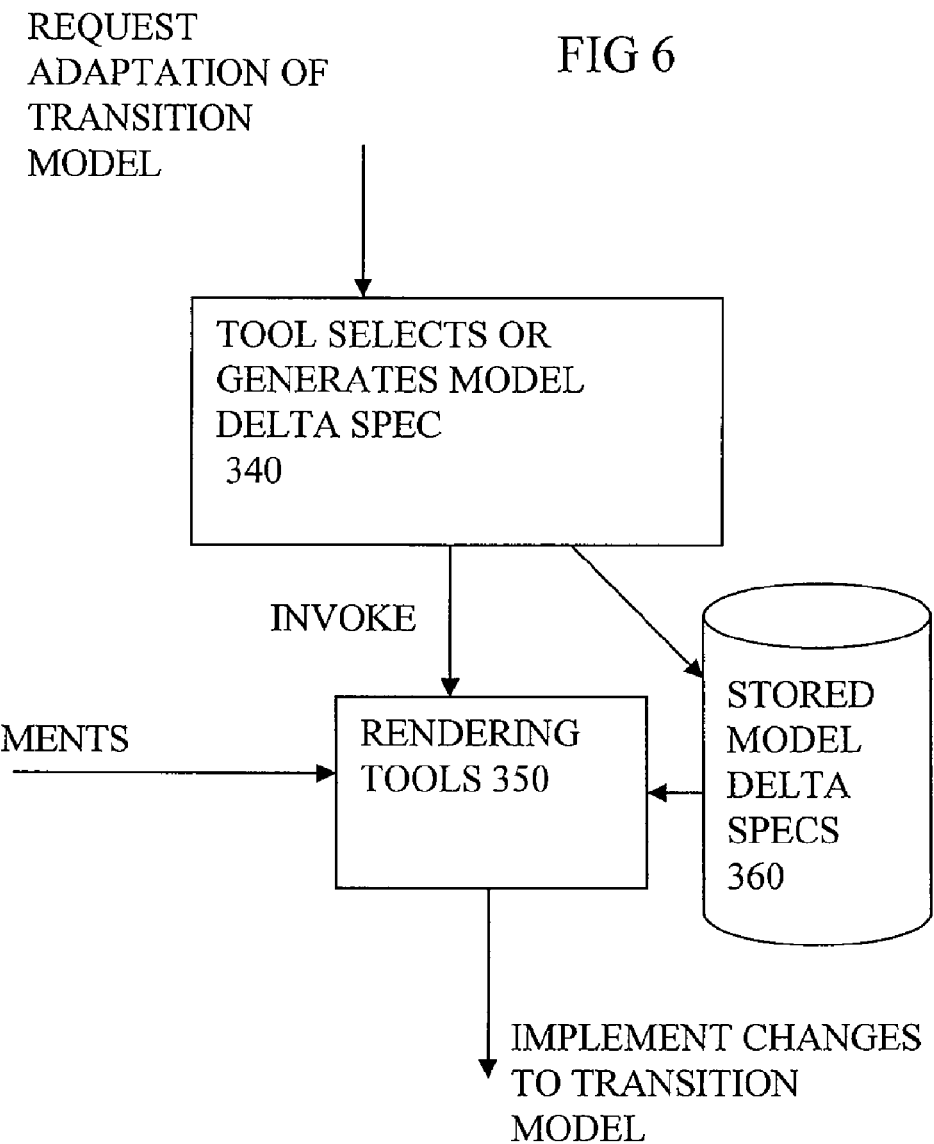
FIG. 6 shows an example of tools for adapting the transition model.

FIG. 6 Tools for Adapting the Transition Model

FIG. 6 shows an example of how to adapt the transition model. Other examples can be envisaged. A request for adaptation of the transition model is received by a first tool. This request could come from the service provider, or the service model state manager could generate it once a previous development has been completed for example, or once service requirements or other conditions exceed a given threshold for example. At step 340 this tool selects or generates a model delta specification (spec). This first tool can be part of the tools 100 or 120 shown in FIG. 3. It can select a predetermined spec from a store 360. Then the tool invokes rendering tools 350 which can get service requirements as needed, and access the selected model delta spec to implement changes to the transition model. Again the rendering tools can be part of the tools 100 and 120 shown in FIG. 3. The service requirements can in some cases be accessed from a store of requirements and in some cases can be obtained in real time or updated during development or during live operation of the service for example. Typically the rendering tools will need to inspect the transition model to determine how to adapt it correctly, and ensure that any adaptation is limited to the parts relating to a given transition if desired. Or it may be desired to make adaptations to other transitions to ensure consistency through the lifecycle.

Figure 7:
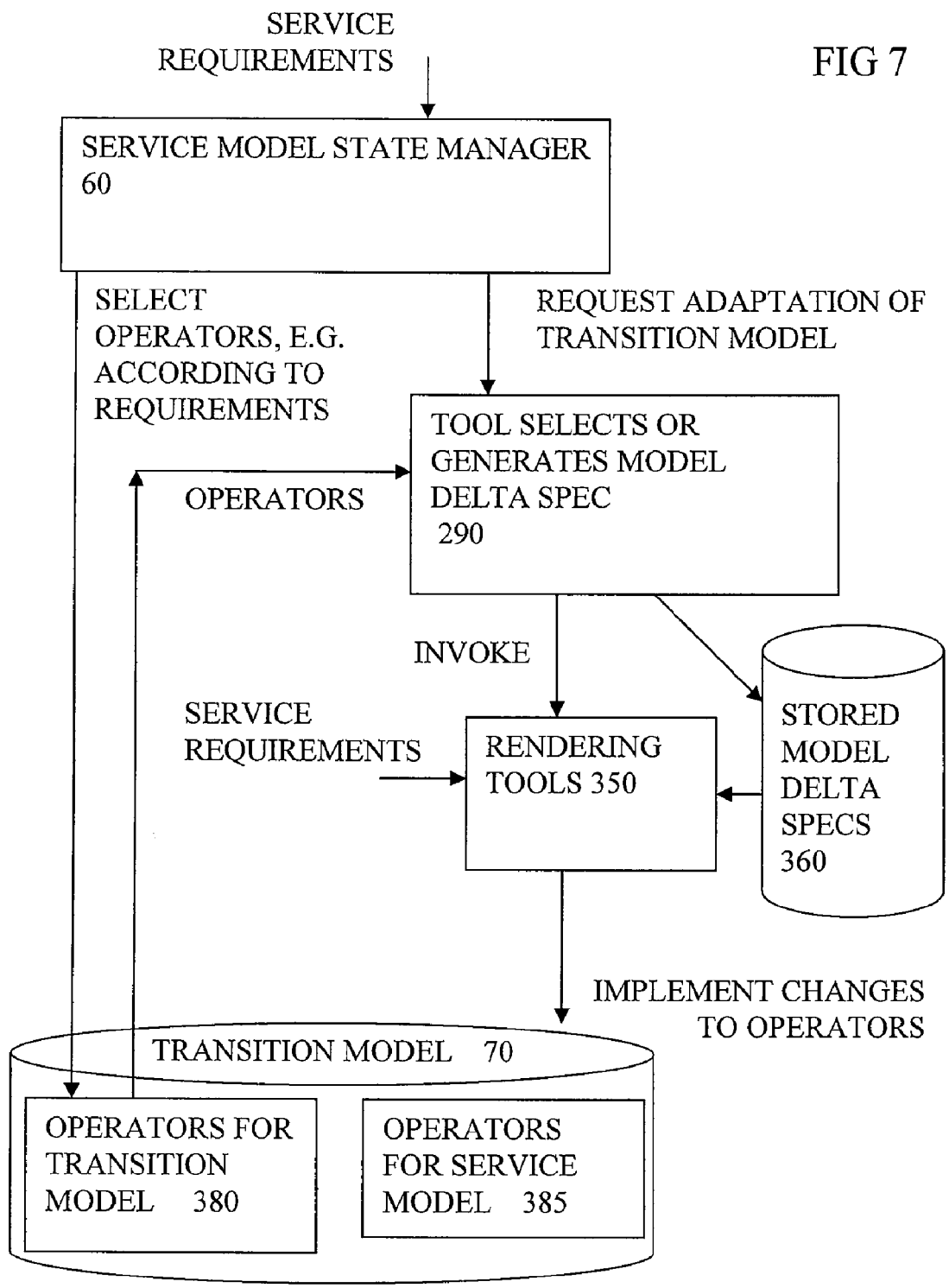
FIG. 7 shows a system according to another embodiment having operators in the transition model for adapting the operators for the service model.

FIG. 7 Operators in the Transition Model for Adapting the Operators for the Service Model FIG. 7 shows a similar view to that of FIG. 6, and corresponding reference numerals have been used accordingly. In this case, the request is for adaptation of the transition model based on operators 380 stored in the transition model, thus the system is more self adapting. These operators can be structured and used in a similar way to the structure and use of the operators 385 for the service model. The service model state manager requests adaptation of the transition model, and selects appropriate operators 380 from the transition model. This selection can be dependent on service requirements or other conditions for example. The selected operator is executed and invokes the first tool 290 with appropriate parameters. This first tool acts to select or generates a model delta spec.

As before, rendering tools are invoked to get service requirements if needed, and use the selected model delta spec to implement changes to the transition model. These changes can be changes to the operators, to the structure, to the parameters, to the transitions, and so on.

Figure 8:
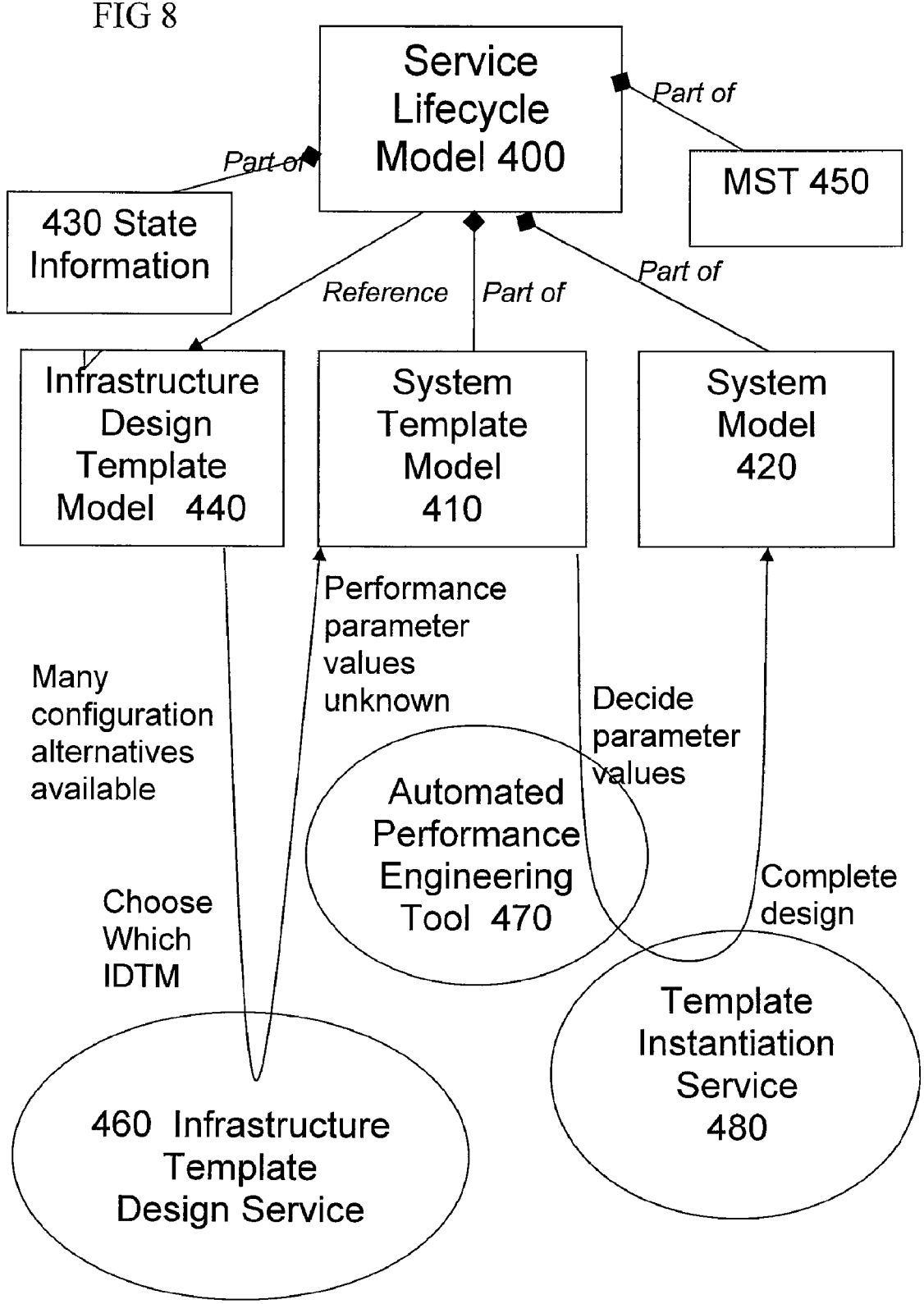
FIG. 8 shows a schematic view of a sequence of states in the lifecycle of the service model.

FIG. 8. Service Lifecycle Model, Sub-Models, and Supplementary Models

FIG. 8 shows an example of a system having a hierarchical structure of models with an SLM 400 as a top level model. The SLM is typically composed of additional sub-models, in particular a service model in the form of a System Template Model (STM) 410 and System Model (SM) 420 that respectively specify the best-practise design pattern for the service and the optimised design of the service that is created from this template. An important part of the SLM is a generic repository to hold state information 430, which may be in the form of key-value pairs; this state information will include representations of the requirements collected from the customer. The SLM may also reference other supplemental models, such as security or business process definition models (not shown).

Some of these supplemental models may contain descriptions used to render parts of the SLM; for example an Infrastructure Design Template Model (IDTM) 440 is used to create the STM. These models contain no explicit notion of service lifecycle or behaviour—they simply specify information about the service, and in particular the desired state of the software and hardware infrastructure. However changes to the model may cause tools to effect corresponding changes to the system under management. Another sub model of the SLM is the Model State Transition (MST) model 450. This specifies the behaviour of the service lifecycle, and so is an example of a transition model. An instance of the MST can be created for each service instance and associated with the corresponding instance of the SLM. The relationship of the SLM and MST for the embodiment outlined above is shown in FIG. 8. The service behaviour is determined entirely by the allowed operations represented in the MST and information held in the SLM, thus making the service lifecycle model-driven. When a service is first instantiated the MST is created for the service instance, bound to the service model, and populated with data that encodes the behaviour of service lifecycle. The MST contains a specification of sequences of parameterised operations that apply changes to the model as the service progresses through its lifecycle.

FIG. 8 also shows the transitions involved in the lifecycle from an Infrastructure Design Template Model (IDTM) through to a System Model. First there is selection of the template (IDTM) configuration parameter values, to fill in the template. These parameters can be provided by the customer and software vendor via functional and non-functional requirements, and are used to guide how the System Template Model is rendered by an Infrastructure Design Template Service 460, from the IDTM.

A second transition in this example involves an Automated Performance Engineering service (APE) 470, which can be used to decide optimal performance parameter values for the System Template Model. A Template Instantiation Service 480 can then be used to create the System Model using the System Template Model and the performance parameter values found by the APE. The System Model can then be used to direct the subsequent acquisition of resources, deployment, and run-time operation for the service instance. Design pattern operations in the Infrastructure Design Template Model propagate through the System Template Model to the System Model. Further supplemental models can be used to guide model transformations and transitions between Service Lifecycle Model states. Such supplemental models are typically specific to particular tools and approaches for addressing non-functional requirements and are not part of the Service Lifecycle Model. A Service Lifecycle Model only includes references to supplemental models. Supplemental models can support for example the Infrastructure Design Template Service, a Security Service, and an Automated Performance Engineering Service, respectively.

Figure 9:
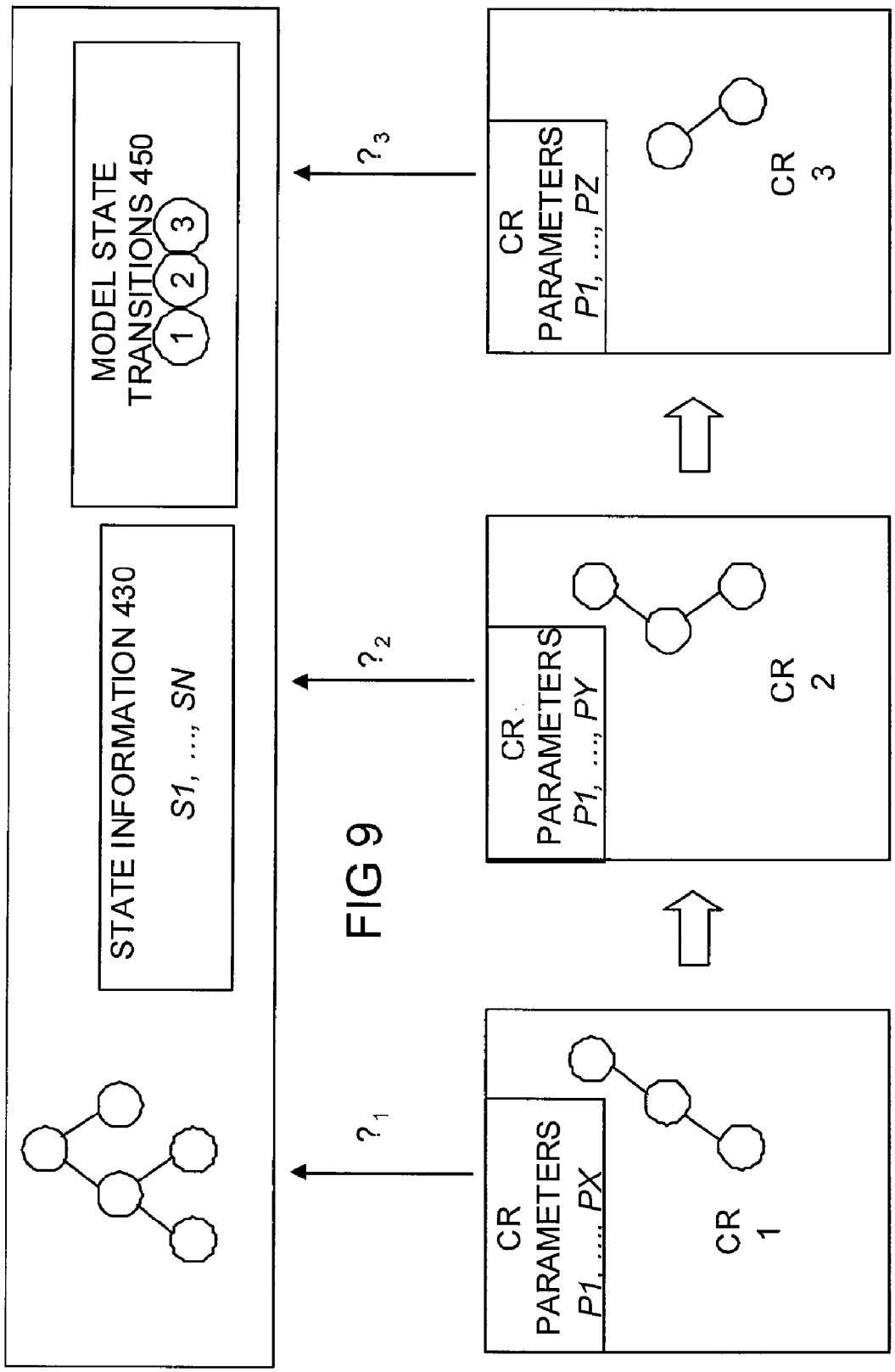
FIG. 9 shows a schematic view of examples of change requests representing a sequence of operators for changing the service model.

FIG. 9. Changes to a Service Model via sequence of Change Requests

Each processing step involves the invocation of a Change Request (CR) to modify the model. The execution of Change Requests is managed by a CR Engine 600.

The CR Engine resolves a submitted CR to the invocation of a tool registered for that CR to carry out the change. The principle is illustrated in FIG. 9, which shows a sequence of three CRs executed in turn to apply deltas to the model; each CR is passed parameters contained in the MST that affect the operation of the CR. CRs can read and write the SLM, analyse the model, and cause actions in the real world. In particular, CRs create and modify the STM and SM, and carry out deployment operations. The action performed by the CRs can be parameterised by information held in the invocation entry for the CRs in the MST. A typical invocation pattern for a CR is that a parameter refers to a supplemental model containing a declarative description of a set of changes to be applied to the SLM. For example, the Infrastructure Design Template Model is a supplemental model that describes the System Template Model. In addition to the parameters passed from the MST, the action of the CR can be modified by the current state of the information in the SLM. In particular CRs can read and write information as key-value pairs in the State Information store, which acts as a convenient shared store to pass the results of decisions and actions from one step to the next. The MST behaviour model is structured into semantically meaningful collections of related processing steps (CRs). The MST defines a set of lifecycle states for the service and allowed transitions between those states. The MST also defines the sequence of parameterised CR invocations to transition the lifecycle of the service between each of the defined states. Preconditions can be specified on transitions between states the transition is only allowed if the preconditions are met. Management of the service lifecycle is presented as requests to transition the SLM to a desired state.

Figure 11:
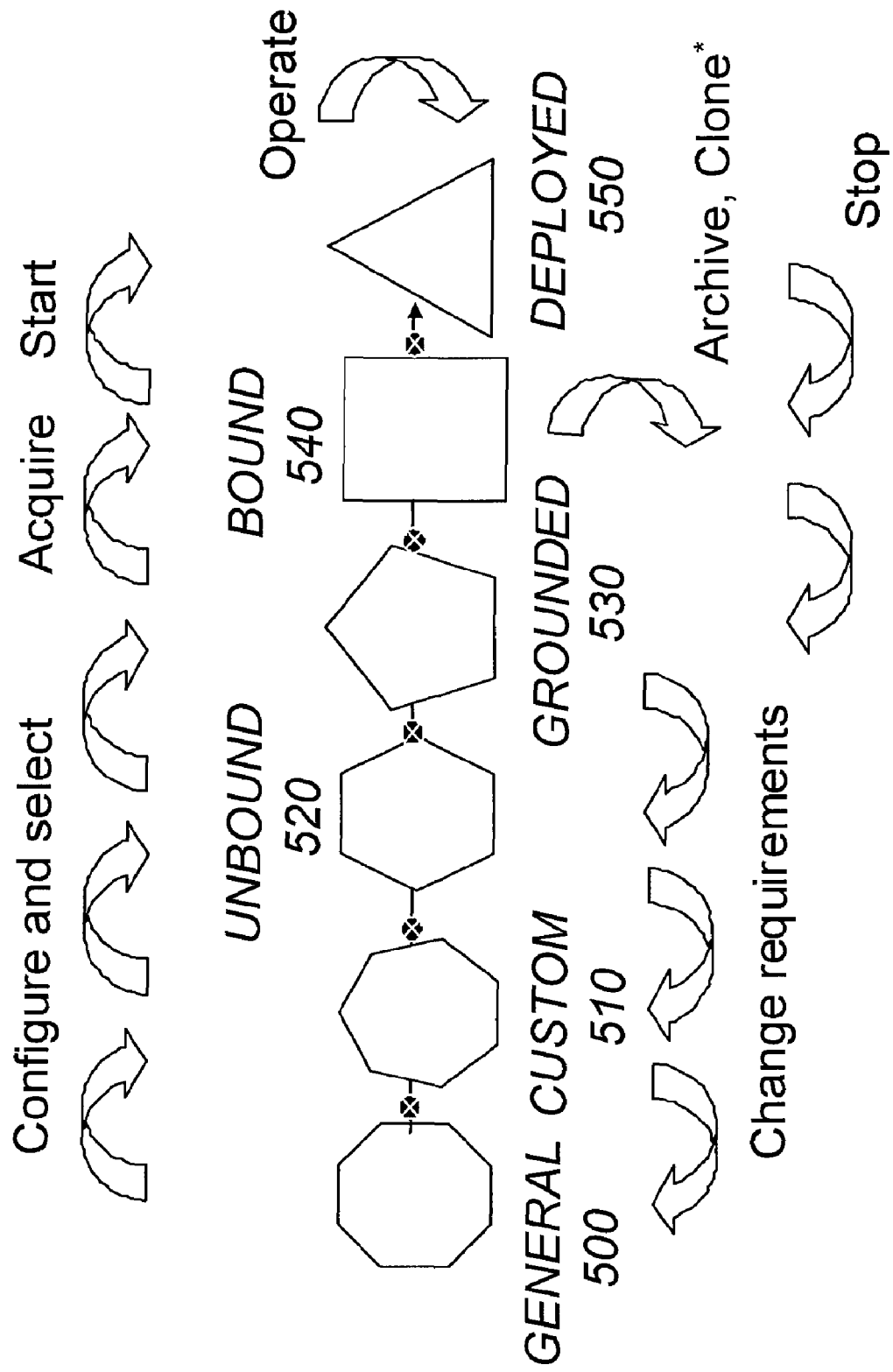
FIG. 11 shows a view of the sequence of FIG. 10 and showing types of transitions between the states.

FIGS. 10, 11 Example of Service Model States (MIF)

These figures show a sequence of states of a service model and is refereed to as a Model Information Flow (MIF). It is described in more detail in Brand et al referenced above, and shows lifecycle states referred to as General 500, Custom 510, Unbound 520, Grounded 530, Bound 540, and Deployed 550 models. Each transition between these states would in general involve the operation of many tools, invoked in the order and parameterised as encoded in the MST model. Each of the states is described in more detail below.

Lifecycle management for service instances can include transitions for purposes such as service design, creation, run-time management, and change management. FIG. 11 illustrates transitions for these purposes in service lifecycle management and their relationship to the states.

A Service Lifecycle Model can be in only one state at a time. Tools can be used to provide largely automated transitions of a Service Lifecycle Model from the general state through to the deployed state. Back-tracking is permitted so that it is possible to explore the impact of changes to service configuration and non-functional requirements on the resulting design for the service instance.

As shown in FIG. 11, service design and creation of the service can involve transitions such as "configure and select", to reach the grounded state. Change management can involve backtracking transitions to earlier states, shown as "change requirements".

The System Model includes a description of the operations that can be performed on a service instance for run-time management. These correspond to transitions on the service instance when its Service Lifecycle Model is in the bound or deployed state. Bound operations support the acquisition of resources (shown as "acquire"), and "archive" action for archiving a service instance for later use, and a "clone" action for cloning of a service instance. Deployed operations support the configuration and operation of a service instance (shown as "operate"), including operations to vary the number of resources. A deployed service instance can be stopped (shown as "stop") and returned to the bound state. It may then be started again to resume in the deployed state. A service instance in the bound state may transition to the grounded state. If desired, the instance's computing and or storage resources can be returned to the resource pool (shown by the arrow from the bound to the grounded state).

Cloning can be used to create multiple instances of a service for development, testing, or production service instances. It is an operation in the bound state that creates another service instance with a Service Lifecycle Model in the bound state. The clone can then be started and run in parallel with the original instance. The clone receives a full copy of a service instance's System Lifecycle Model up to information for the grounded state. Different resource instances are acquired to provide an isolated system in the bound state.

The MIF shown in FIGS. 10 and 11 links three viewpoints.
1. The configuration of service functionality offered by a software provider.
2. The configuration of software components that implement the service instance.
3. The configuration of infrastructure, virtual and physical, that hosts service instances.

The MIF enables a change in one viewpoint to be linked to changes in other viewpoints. For example it links a change in selected service functionality or non-functional requirements to necessary changes in application configuration and infrastructure topology. Conversely, model information can also be used to determine the consequences of changes to infrastructure on service instance behaviour.

The MIF is an example of a service model such as a Service Lifecycle Model (SLM). The Service Lifecycle Model encapsulates service instance specific model information and can evolve through the states shown in FIG. 10 or 11. The lifecycle starts on the left hand side with for example a catalog of services that are supported, and ends on the right with a deployed and running system. Cycles can occur at every step, but are not shown in the figure for reasons of simplicity. The states govern service configuration, infrastructure selection, resource acquisition, deployment and run-time operation of the service instance. The following subsections describe the service catalog and the states of the Service Lifecycle Model in more detail.

Service Catalogue

A service catalogue identifies the services that can be provided. Given an example context of supporting high value enterprise services for a software vendor such as SAP, each entry in the catalog describes a service that is a collection of related business processes. Examples of business processes include sales and delivery, and supply chain management. The description includes textual descriptions and visual notations such as BPMN (Business Process Modelling Notation) to illustrate the business processes. In addition, the catalogue entry specifies a tool-set that supports the creation and management of a corresponding service instance.

Once a service has been selected by the customer (in the sense of the service provider for example) the entry in the catalogue is used to create a Service Lifecycle Model for the service instance. The Service Lifecycle Model can be in one of six states: general through deployed. The Service Lifecycle Model transitions between states as the tool-set operates on the service instance. The following subsections describe the model information that is captured in each state and give examples of tools that are used to support the transition between states.

General

This is the initial state of the Service Lifecycle Model. Once the Service Lifecycle Model data structure is prepared it is able to transition to the custom state.

Custom

The custom state augments the Service Lifecycle Model with functional and non-functional requirements. These requirements are collected by one or more tools in the tool-set.

A functionality configuration tool for the service lets a customer specify the subset of the service's business processes that are to be used. For example, sales and delivery may be needed but not supply chain management. Furthermore, each business process may have several business process variants, i.e., logic that handles different business circumstances. The desired set of business process variants for each chosen process must also be specified. For example, if the customer's business does not accept returned goods then a sales and delivery process variant that supports returned goods would be excluded from the service instance.

Configuration parameters are presented to the customer by the tools that reflect what can be instantiated later. A binary option can be offered for availability which controls whether or not a fail-over pair is created for appropriate hosts in a service instance. A fail-over pair consumes additional resources and may therefore affect cost. Similarly security is offered as a binary option in the current implementation. It controls the subnet architecture of infrastructure and whether or not firewalls are used. A scalability option determines whether a solution is deployed to a centralized solution with a single host or decentralized solution with multiple hosts.

The custom state also gathers customer performance requirements. These are specified in terms of throughput and response time goals for business process variants. The information is used by subsequent tools to support infrastructure design selection and performance sizing.

Once a customer's functional and non-functional requirements for the service are fully specified, the Service Lifecycle Model is able to transition to the unbound state.

Unbound

The unbound state augments the requirements for the system with information from the software vendor. Information from the software vendor includes a description of components needed to support the chosen business process variants. These may include application servers, search servers, and software code artifacts. Knowledge of which components are needed can affect the choice of infrastructure in the next state. Software vendor information also identifies external software components that are not part of the service being deployed but that are used by the service instance. For example, an order and invoice processing business process variant may require external output management services for invoice printing and credit check services for checking financial details. A tool recognizes which external services are needed, prompts the customer to choose from a list of known service providers, and obtains any additional configuration information from the customer.

Once software vendor specific requirements are completed, the service instance has its requirements fully specified. The System Lifecycle Model is able to transition to the grounded state.

Grounded

The grounded state develops a complete design for the service instance. This includes the detailed infrastructure design, the mapping of software components to infrastructure components and references to configuration data required by the components. One possible implementation uses three tools to refine information from the unbound state to create the design information for the grounded state.

The first tool is the Infrastructure Design Template Service. This tool uses configuration parameters and requirements information collected from the customer and software vendor in previous states to select an appropriate infrastructure design pattern from a collection of design alternatives for the service. The pattern addresses many aspects of the service instance including hardware and software deployment through to operations needed for run-time management. Once the alternative is selected, the Infrastructure Design Template Service initializes a System Template Model for the service instance and stores it in the Service Lifecycle Model. The template is made from a vocabulary of real-world concepts, such as computer system, subnet, and application server.

A System Template Model specifies ranges and default values for performance parameters such as the number of application servers, the amount of memory for each application server, and the number of worker processes in the application servers. Options selected by the customer such as high-availability and security are also reflected in the template, e.g., fail-over pairs and subnet architectures.

A second tool specifies the performance parameters described above. Two implementations to perform this function will be described. This illustrates the flexibility of this approach in enabling alternative tool-sets. The first implementation simply inspects the template for performance parameters and allows the customer to set them. The customer can set a parameter within the range specified, or a default can be selected. The second implementation is an Automated Performance Engineering (APE) Service. It exploits performance requirements and predictive performance models to automatically specify appropriate performance parameter values.

The third tool is the Template Instantiation Service. It takes as input the System Template Model and corresponding performance parameters. It outputs a System Model that becomes part of the Service Lifecycle Model. The System Model is a completed design for the service instance that is expected to satisfy non-functional requirements. Once the System Model is created, the Service Lifecycle Model is able to transition to the bound state.

Bound

The bound state refines the grounded state with the binding to resources, e.g., hosts, storage, and networking from a shared virtualized resource pool. A Resource Acquisition Service interacts with a Resource Pool Management Service from an infrastructure provider to acquire resource reservations according to the service instance's System Model.

In the bound state the service instance can have side-effects on other service instances. It may have locks on resources that prevent them from being used by others and it may compete for access to shared resources. Once all resources have been acquired, the Service Lifecycle Model is able to transition to the deployed state.

Deployed

The deployed state refines the bound state with information about the deployed and running components that comprise the service instance. This includes binding information to management and monitoring services in the running system. A Resource Deployment Service configures and starts the resources. A Software Deployment Service installs the software components specified in the System Model and starts the service instance so that it can be managed. The System Model includes sufficient information to ensure that components are deployed and started in the correct order. A Software Configuration Service loads service configuration data previously obtained from the customer, such as product entries to be added to a database. Finally, the service instance is made available to users.

Figure 12:
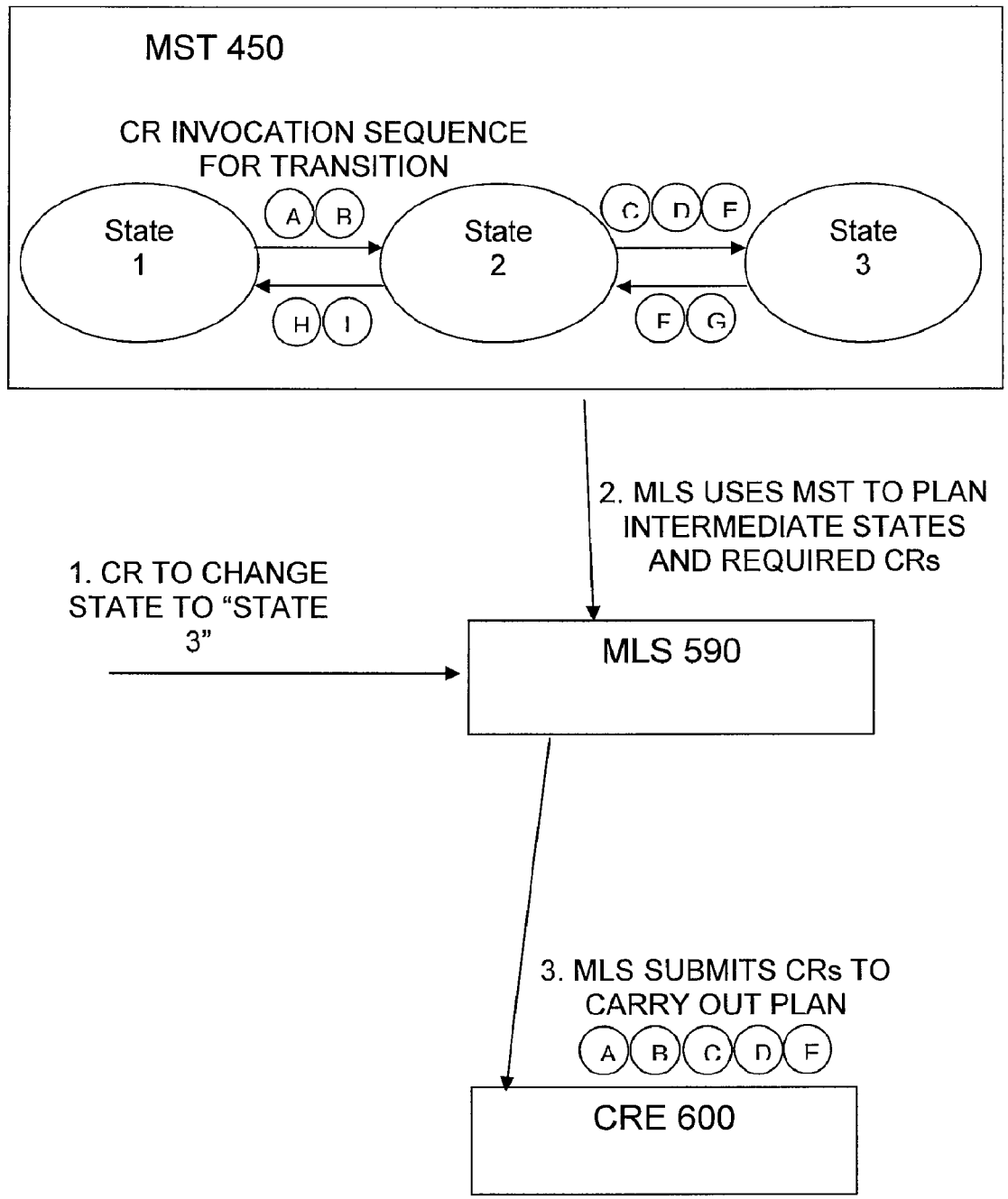
FIG. 12 shows a view of state transitions in a transition model, being accessed by a service model state manager in the form of a model lifecycle service and change request engine.

FIG. 12. Use of MST by MLS to Plan CRs for Transitions of Model State

Model transitions can be implemented using a common Change Request (CR) mechanism. The registered tools that carry out the CRs are trusted components. CRs can have good characteristics for predictability, safety, and correctness because of the combination of pre- and post-conditions for integrity checking, with actions performed only by trusted components with well-known behaviour. Since all changes to the model initiated by the MST are performed and mediated via CRs, the effects of carrying out the service lifecycle can also be controlled and checked.

Services can have a palette of CRs available to them to be able to make changes to the model. A service hosting platform can control the set of CRs in this palette. A service instance can extend the set of CRs referenced in the SLM models and MST up to this maximum. The actual subset of CR types used by the MST, and the parameters passed to them, can be encoded in the model. Consequently the effects of executing the MST can be reasoned about. More trusted services may be allowed to dynamically extend the set of CRs in the palette with service specific CRs that reference service-specific tools that are dynamically loaded to extend the platform.

The set of defined states and allowed transitions between them forms a state space for the service. As shown in FIG. 12, a trusted service, the Model Lifecycle Service (MLS) 590, performs the planning through state space to transition the service to the desired end state by submitting a set of CRs in the order, and with the parameters, specified in the MST. To reach the desired state, the MLS may need to take the model through one or more intermediate states. For example in the Model Information Flow shown in FIG. 10, a request to go to the deployed state when the model is currently in the General state involves the sub-goals of achieving the Custom, Unbound, Grounded, and Bound states. The MLS is integrated with and invokable by the CR mechanism, just like other platform services such as the Resource Deployment Service. The MLS executes CRs of the form changeModelStateTo: "desiredState" to transition the Service Lifecycle Model to the desired state. When a Change Request is issued to the MLS, it plans the required intermediate state transitions and actions by transforming the information in the MST to a valid sequence of CRs submitted to the CR Execution Engine. The scheme is shown in FIG. 12. In this example the MLS uses the MST to determine that to move the model from State 1 to State 3 requires the following sequence of CRs: A, B, C, D, and E. The MLS submits instances of these CRs to the Change Request Engine for execution A', B', C', D', and E'. The representation of CR-related information in the various models can more complex than FIG. 12 might suggest. For example a CR can represent a structure of child CRs.

The model-driven nature of the service lifecycle is very powerful. The sequence of allowed state changes, and the required CRs and their parameters to transition between states, can be modified at run-time by the tools invoked by CRs. Thus the behaviour of the system can be changed in response to information collected while progressing through the lifecycle. For example, if APE is required then a CR can be issued to update the MST to include CRs that cause the appropriate services to execute. In this way service lifecycle management is customized for the type of service and service configuration required by a customer.

Change Request Framework

This section describes a Change Request (CR) framework that enables the planning, submission, and execution of CRs. CRs can cause updates to models and run-time and change management for service instances.

Change requests are declarative, they state what needs to be accomplished, but leave out the details of how the modifications should be carried out. CR state includes the following.

A requestID that identifies the task to execute, e.g., create, clone, migrate, and stop.

A request Version identifies the implementation version.

The context describes the model entity against which the change request is submitted. The context can be the whole model, or particular entities within the model such as elements corresponding to software components or infrastructure nodes.

parameters: primitive types or reference to any model entities.

pre-conditions and post-conditions: logical conditions that must be true prior/after the execution of a CR along with an implementation that evaluates the conditions.

subtasks: contains optional refinements of the change request into finer grain steps which are also CRs. Steps can execute in sequence or in parallel as defined by an ordering field.

dependencies: an optional set of references to external CRs that must complete before the change request can be processed.

The lifecycle of a CR is described as follows. A submission tool creates a CR and links it to the model entity it will operate on. First, a static validation takes place. Since the model entity contains only the set of CRs it allows, the validity of the request can be verified prior to submission. Assuming that the CR is valid, its current state is persisted in the model and passed to a CRE that initiates processing.

The CRE is a core backend service that coordinates tools and causes the execution of CRs. Tools register with the CRE to specify the request and model entity types they can support. For example, a virtual machine management tool registers that it supports migrate CRs on model entities of type virtual machine. Given a request to execute, the CRE looks at its request ID and the model entity against which the request is submitted and finds the appropriate service. Each tool has a unique identifier: a URL. Assuming a tool is found and once the matching is done, the CRE persists the tool identifier in the CR in order to keep track of the implementer.

The CRE invokes the tool and a second round of dynamic checking takes place where the tool itself evaluates the CR's pre-conditions. For example, a request to increase the memory of a virtual machine will be rejected if the specified amount exceeds the free capacity of the physical host. Assuming the CR's pre-conditions are all validated, the tool proceeds to execute its finer grain processing steps. Once the finer grain steps are completed the tool enters a finalization processing phase where post-conditions are evaluated and current state is persisted in the model. State information captures change history for a service instance and can be used to support charge back mechanisms.

Finer grain steps for a CR are represented as a directed graph of CRs where the children of a node are subtasks, i.e., refinements, of the root CR. The graph encodes how the subtasks are ordered, and their dependencies. Whether the requests are handled in sequence or in parallel is defined by an ordering attribute. As an example of how these are used, in the case of SAP, the installation of a database and an application server can take place in parallel. However, strict ordering must ensure that the database is started before the application server.

The execution of a CR by a tool takes place asynchronously with respect to the orchestration environment. Each tool is responsible for updating and persisting progress for the run-time state of the request in the model and, in the case of failure, for being able to roll-back its changes or initiate an interaction with a human operator. The change request framework is compatible with fully automated and partially automated management. Even though most tasks can be dealt with in automated fashion, some tasks may require human intervention. Operation prototypes for CRs enable the dynamic creation of human readable forms for CRs that permit humans to complete CRs when necessary.

Figure 13:
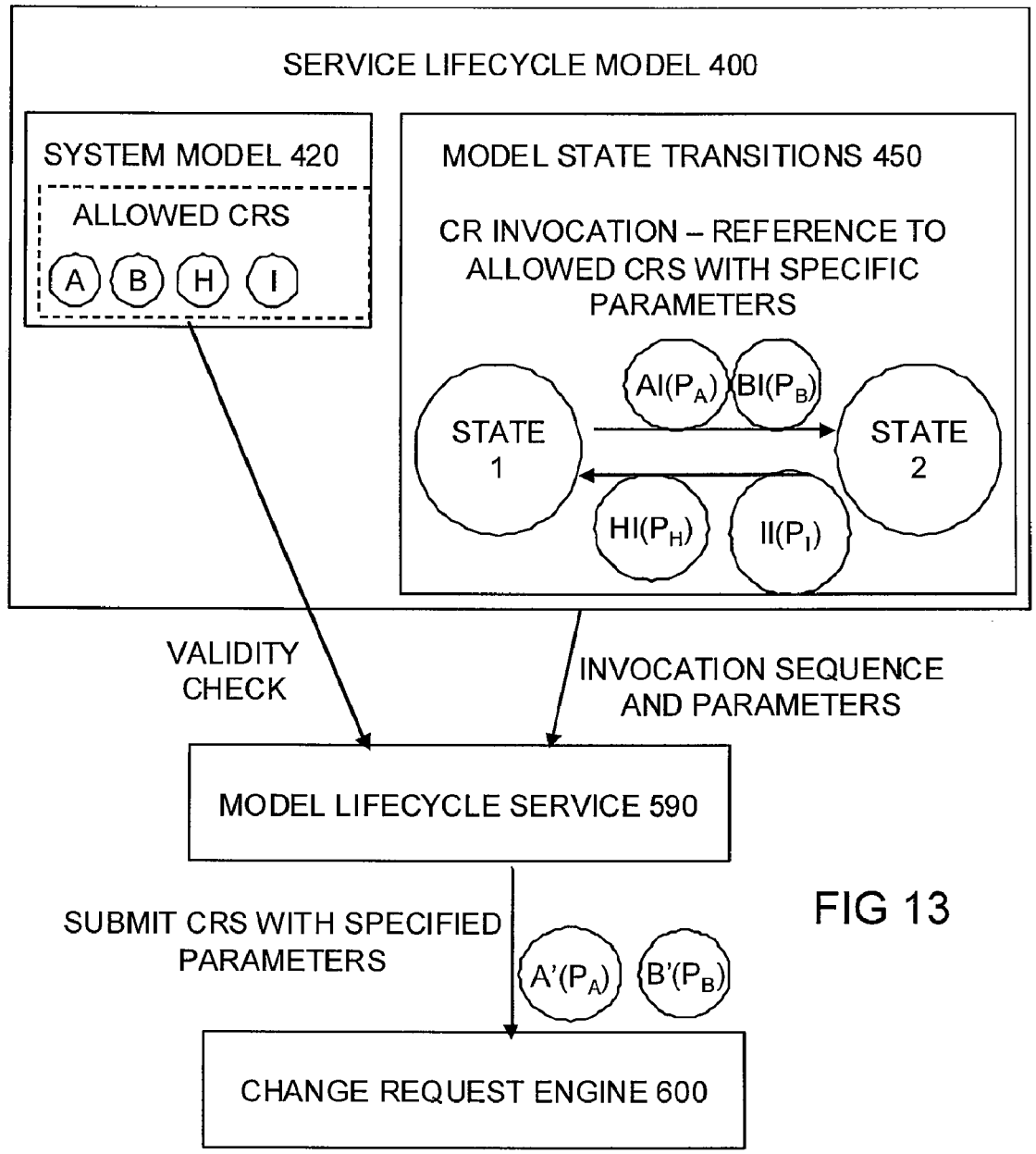
FIG. 13 shows a schematic view of a model lifecycle service carrying out validity checks on representations of state transitions in the transition model.

CRs can be hand crafted by humans as part of the development of an Infrastructure Design Template Model. In particular, to implement each CR they specify the sequence of tools that will be run and the parameters that are passed to each tool. It would also be feasible to exploit information about pre and post-conditions to enable descriptive CR subtask planning. Technologies such as model-checking may be used to reason about a CR and automatically develop a plan for a CR that exploits other CRs as subtasks to implement it. FIG. 13. Relationship of Allowed CRs, CR Invocation Specification and Submitted CRs FIG. 13 shows an example of relationships between CR-related entities in the System Model 420, MST 450, and CRs submitted to the CR Engine CRE 600. The System Model stores the set of allowed CRs that can be submitted to change the model, A, B, H, and I. The encoding of allowed CRs includes a specification of various constraints on the CR, such as valid ranges for parameters, pre- and post-conditions, and dependencies with other CRs. The MST actually encodes invocations of the allowed CRs to be made at run-time, $A_i(pa), B_i(pb)$, etc; for each invocation a reference is made to the allowed CR together with the specific parameters to apply for the invocation. When a change of state is requested, the MST 590 can submit instances of the defined CR invocations, $A'(pa), B'(pb)$, etc to be executed by the CR Engine. Before submitting a request, the MLS can first check the invocation parameters against the constraints defined for the allowed CRs.

Specification of the Content of the MST

Since the MST is a model, both the initial content and subsequent changes to the MST can be specified using declarative descriptions in a modelling language, which itself can be regarded as a model—the MST Specification Model. The MST Specification Model is specified in a human-readable, textual modelling language that can be rendered into the native representation of the MST in a model repository. An important characteristic of this language is that it can contain conditional statements that determine the output of this rendering process. The conditional statements can refer to other entities in the SLM, in particular the key-value pairs in the State Information which act as parameters to the rendering process. The combination of parameterisation and conditional statements are important for a flexible specification of the entities to be created or modified in the MST, and the values of the attributes of these entities. The selection of the initial MST Specification Model can be a key part of service instantiation, since it defines the initial content of the MST that sets in motion the subsequent lifecycle behaviour and the range of possible changes to that behaviour. It is a key part of the definition of the type or class of service. The rendering of the MST Specification Model to create or modify the underlying representation of the MST model in the model repository is performed by a rendering tool.

The rendering tool is exposed via a CR interface, which takes a reference to an MST Specification Model as a parameter. This CR can be referenced in the MST, allowing the MST to update itself An embodiment can use SmartFrog as the language for MST Specification Model, reusing the declarative model description technologies used for the Infrastructure Design Template Model mentioned earlier. Other languages or structures can be used for the MST specification model. The Eclipse Modelling Framework (EMF) or other similar schemes can be used to represent the MST, SLM and other associated models, such as the STM and SM.

Behaviour Adaptation

The MST is stored in a model, which can itself be modified by a CR just like any other model associated with the SLM. For example, CR2 of FIG. 14, may cause the MST itself to be updated to affect the operation of CR3, as will be described in more detail below. This model-driven nature of the service lifecycle can be very powerful. The defined service lifecycle states, allowed state changes, and the required CRs to transition between states (including the parameters passed to the CR, and the order in which they are invoked) can all be modified at run-time as the service lifecycle progresses. Thus the behaviour of the system can be changed in response to information collected while progressing through the lifecycle. For example, if an Automated Performance Engineering (APE) analysis is required to fine tune the design of the service to better meet performance requirements, then a CR can be issued to update the MST to add a CR that will cause the APE service to execute. In this way service lifecycle management is customized for the type of service and service configuration required by a customer. When writing services at least two styles can be adopted for creating and updating the MST. Variations on these two styles are also possible. In the first style, the initial specification of the MST, created when the service is instantiated, need not specify the behaviour of the complete service lifecycle. The initial content of the MST may be very small, and only include the state transitions for the first part of the service lifecycle, perhaps to collect the requirements for the service. The MST would grow as the service lifecycle progresses—it is extended by the CRs invoked during the initial state transitions with additional or modified state and transitions that specify subsequent service-specific lifecycle behaviour targeted at the requirements. Another equally valid style is to fully populate the MST at service creation, and only allow very specific limited modifications to the MST to customize service lifecycle behaviour. Either style can be supported and selected.

Figure 14:
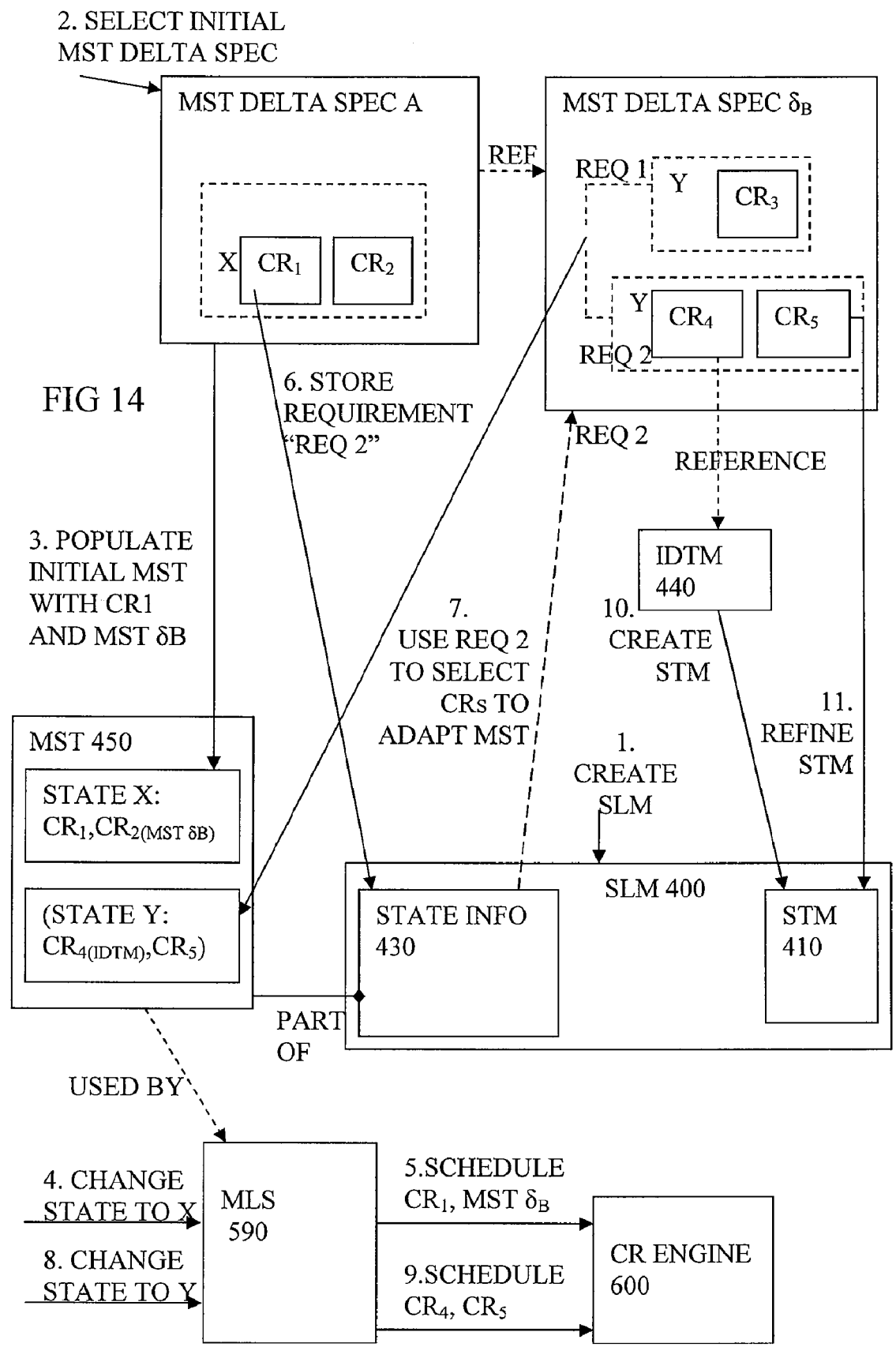
FIG. 14 shows a schematic view of operations to adapt a transition model and a service model according to an embodiment.

FIG. 14 Operations to Adapt a Transition Model and a Service Model

An example of operation of an embodiment is further described below, with reference to FIG. 14. The figure shows a simple example scenario, using the first style just described, that involves creating a service instance and progressing the service lifecycle to collect customer requirements and create an optimised design template for the service to meet those requirements. The figure shows the Service Lifecycle Model and associated sub-models, including the MST. Note that the service states, and operations to achieve those states, defined in the example are only illustrative of the principles of managing service lifecycle. In the example, the MST is initially created from MST Specification A with only one state transition, to State X, to progress the first part of the lifecycle that gathers requirements. It is then extended by MST Specification δB with an additional state, state Y, to continue the lifecycle to create an optimised design.

The sequence of steps is:

1. Create new service instance. A SLM instance is created for the new service instance. The SLM is initially essentially empty, with minimal bootstrap lifecycle behaviour and state associated with it. Initially no state transitions are defined—neither State X nor State Y exist in the MST.
2. Select service type. The service does not yet have any lifecycle behaviour associated with it, beyond bootstrap behaviour. The service type is set by selecting an MST Specification from a catalogue, in this case MST delta Specification A is selected. The initial specification either directly specifies the behaviour to progress all lifecycle phases (collection of requirements, design, deployment, post-deployment, operation, etc.), or simply specifies the behaviour of initial phases which can then extend the MST to define subsequent behaviour appropriate for the requirements. This example uses the latter approach.
3. Populate MST to be able to progress service lifecycle. MST delta Specification A is rendered to add information to the MST. In this example, it only specifies the initial part of the lifecycle, and introduces a new state, State X. The information added to the MST specifies that to reach State X two CRs need to be scheduled, CR1 and CR2. In the example State X represents the notion of that all customer requirements have been collected.
4. Collect customer requirements. A request is made to change the service state to State X In this case, the service should collect the requirements by carrying out the CRs to transition to the state that customer requirements have been collected. The request can be made either automatically by the service creation logic or by the service administrator. This request is itself in the form of a CR, implemented by the Model Lifecycle Service.
5. Plan model changes required to reach desired state. The MLS plans the appropriate sequence of steps through state space to reach State X, using the information in the MST. In the example, this involves scheduling the invocation of CR1 and CR2 with the Change Request Engine.
6. Collect customer requirements. CR1 executes a tool to present a set of questions to the customer of the new service and collect the requirements for the service. For example, how many users are to be supported, what are the security requirements, or should the reliability and performance be Gold, Silver or Bronze level for example. The questions to be presented may be in a supplemental model (not shown in FIG. 13) referenced as a parameter in the CR1 invocation entry. CR1 writes the actual customer requirements to the State Information part of the model in the form of a key-value pair, req="Req 2".
7. Adapt service lifecycle behaviour to requirements. The final step to reach State X is to execute CR2. CR2 invokes the MST rendering tool with MST Delta Specification δB. MST Delta Specification δB is designed to modify the service lifecycle behaviour in the MST to meet the collected requirements. MST Delta Specification δB applies a delta to the MST that extends the set of service states to allow the service to progress further through its lifecycle. A new state, State Y, is added that represents the notion that a System Template Model has been created for the new service. MST Delta Specification δB specifies one of two possible transitions to reach State Y; the appropriate choice is determined by the collected requirements. Conditional logic in MST Delta Specification δB references the location in the service State Information store containing the key-value pairs that represent the requirements, and determines which of the two possible state transitions to State Y will be selected—i.e. the sequence of CRs, with parameters, that will be added to the MST. The requirements parameterise MST Delta Specification δB. Two possibilities exist, Req 1 and Req 2. In the example, Req 2 was selected so CR4 and CR5 are used for the definition of the transition to State Y. Had Req 1 been chosen, the transition to State Y would only have involved CR3.
8. Initiate creation of design template. A request is made to change the service state to State Y, defined as a service with a complete System Template Model that best meets the requirements. As before, the state change request is made as a Change Request for the Model Lifecycle Service.
9. Plan model changes required to reach desired state, State Y. To carry out the requested state change, the MLS again plans the appropriate sequence of steps through state space to reach State Y. In this case, this means scheduling CR4 and CR5.
10. Create a service design template to meet requirements. CR4 executes a tool called the Infrastructure Design Template Service (IDTS) (not shown here, but an example of a rendering tool 350 shown in FIGS. 6 and 7)) which uses a supplemental model, the Infrastructure Design Template Model (IDTM) 440, to create a System Template Model (STM) 410 representing the best-practise design pattern. The CR4 invocation entry has a reference to the appropriate IDTM (set earlier by CR2), to be passed as an input parameter to the IDTS. The IDTM contains a specification of deltas to the SLM, access-rights permitting, to create the STM.

The IDTM contains conditional logic that references the requirements collected in the previous steps. Thus the requirements collected by CR1 are used by CR2 to decide the appropriate modification of the behaviour for the service encoded in the MST; the requirements are also used by CR4 to affect how to render the IDTM to an appropriate design template. This illustrates the principle of the MST being used to orchestrate changes to the service model, and also changes to the MST itself in response to requirements. It also illustrates the multi-step application of CRs—decisions made by step n are persisted in the model and become input parameters to steps n+1, n+2, etc.

11. Further refine the design template. The final step in the transition to State Y is to execute CR5. CR5 executes an Automated Performance Engineering (APE) service 470 that refines the range values in the STM design template to better meet performance requirements. APE does this by performing simulations of the run-time operation of the system. Had requirement Req 1 been chosen earlier, this optional step would not have been included in the MST state transition to State Y and therefore not performed.

Some advantages of the embodiments described include: Fuller automation as the Service Model can be automatically updated for all or part of the lifecycle of a service, from collection of requirements, through design, to deployment. More reuse as patterns for managing service lifecycles as models can be defined, shared, and customized. This gives easier access to functionality, which is easier to maintain and check for correctness with less manual input. More flexibility is realised as the encoding of service behaviour can be automatically manipulated to allow a service to adapt to changing requirements and demands at run-time.

Infrastructure Design Template Models and the Template Instantiation Service

Designing and managing an IT system to support a service is a complex, error-prone activity that requires considerable human expertise, time, and expense. An important goal is to automate this process using best-in-class strategies distilled from human experts. An Infrastructure Design Template Model captures integrated best-practice design patterns for a service. It is prepared by humans and takes into account configuration options and non-functional requirements. Infrastructure Design Template Models are supplemental models.

An Infrastructure Design Template Model is made from a vocabulary of real-world concepts, such as computer system, subnet, or software service. It can in some cases include the following.

The structure and configuration of the hardware infrastructure such as computer systems, disks, NICs, subnets, and firewalls.

The characteristics of the required hardware are specified, such as the type, processing power and memory of a computer system, the bandwidth of a NIC, or the size or latency of a disk.

The internal structure and configuration of the software services running on each computer system, in sufficient detail to automatically deploy, configure, and manage them; additionally, the deployment dependencies between the software services, such that they are installed, configured, started, taken on-line, taken off-line, stopped and removed in the correct order.

The configuration of the monitoring and alarms for the hardware and software landscape.

The set of operations, represented as Change Requests (CR), which can be applied to extend or modify the system.

Configuration parameters and performance parameters.

An Infrastructure Design Template Model can also include embedded logic that matches configuration parameters to a particular design. Configuration parameters give the ability to encode related families of structural alternatives in a single Infrastructure Design Template Model thereby preventing an explosion in the number of instances of such models. Without this ability, a system characterized by just 7 Boolean choices would, in the worst case, require $2^7$ (128) distinct Infrastructure Design Template Models that must be maintained separately. Infrastructure Design Template Models provide a powerful way to model topological alternatives—modules are only instantiated if required and relationships between modules are appropriately configured.

Infrastructure Design Template Models can be expressed using the SmartFrog textual notation as a data modeling language for example. The language provides typing, composition, inheritance, refinement, conditional instantiation, information hiding, and constraints, allowing creation of compact, modular, configurable descriptions of systems. An example extract is as follows:

```
aCompSystem IF (! ext_centralized)   Comment...
CENTRALIZED   means conditional instantiation of Monitored Computer
System - instance only needed if not centralised system
  THEN extends MonitoredComputerSystem {
    NICs extends { nic extends AI_NIC { subnet IF (ext_secure)
    THEN dbSubnet
    ELSE asSubnet FI; }} Comment... SECURE means connect
    NIC to DB or
    Application Server subnet and DUAL means need both DB and
    AS software otherwise just AS
    groundedExecutionServices IF (ext_dual)
      THEN extends { db extends DatabaseSoftware; ci extends
      ApplicationServerSoftware; }
      ELSE extends { ci extends ApplicationServerSoftware; }
    FI
    operations extends { updateMemory extends
    UpdateVirtualMachineMemoryCR; }
    } Comment instances of this template can request change in memory
    at run-time
  FI
```

The extract above represents an Infrastructure Design Template Model fragment, showing references to template parameters, conditional instantiation and operations. Boxed parts are comments. It is driven from three Boolean template parameters (ext_centralized, ext_secure, and ext_dual) that illustrates the conditional instantiation of a monitored computer system. The conditional instantiation of the computer system (aCompSystem) is controlled by the variable ext_centralized. Conditional reconfiguration of software running on it (groundedExecutionServices) is controlled by the variable (ext_dual), and the networking topology (NICs) is controlled by the variable ext_secure. Also note that the template fragment defines the set of allowed CRs as prototype operations. The allowed CRs may also depend on the configuration alternative.

The Infrastructure Design Template Service and the Template Instantiation Service will now be discussed. They support the creation of a System Template Model and System Model, respectively.

The Infrastructure Design Template Service loads the SmartFrog description of an Infrastructure Design Template Model. For each choice of configuration parameter values, the Infrastructure Design Template Service is able to render a corresponding System Template Model in the Eclipse Modeling Framework (EMF) modeling notation.

Figure 15:
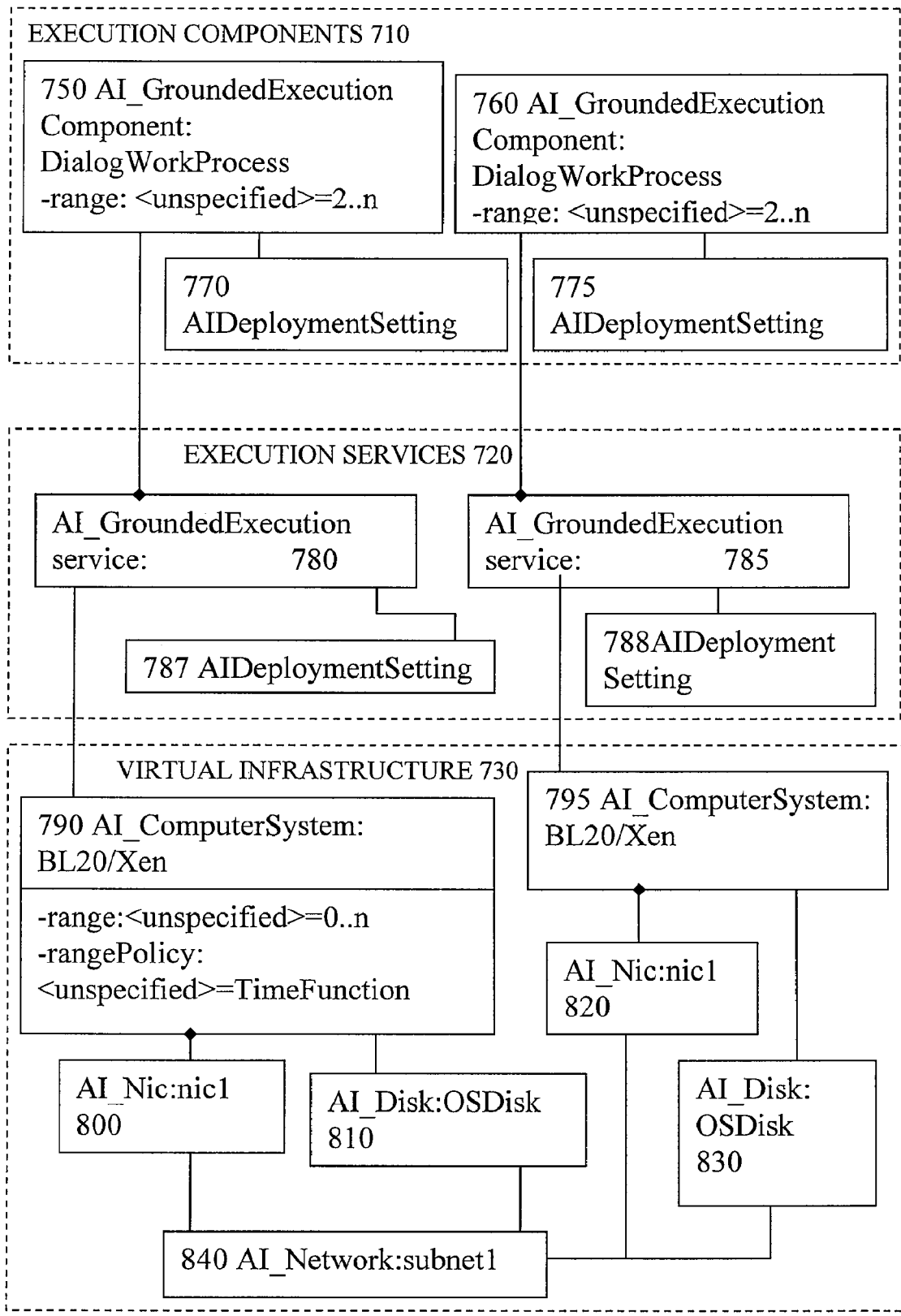
FIG. 15 shows an example of a system template model in the form of a UML diagram for part of a decentralized SAP system.

FIG. 15 UML Diagram for an STM for a Decentralized SAP System

FIG. 15 shows a Unified Modelling Language (UML) diagram for a System Template Model for a decentralized SAP system.

There are three levels shown by dotted line boxes. A virtual infrastructure level 730, an execution services level 720 and an execution components level 710.

At the virtual infrastructure level the figure shows two types of computer system—a distinguished Application Server called the Central Instance (right), and additional Application Servers called Dialog Instances (left)—and how they are connected on a subnet. The two computer systems 790, 795, are coupled by a network 840 labelled "AI_network", the right hand of the two systems corresponding to a master application server, and the left hand one corresponds to slave application servers. Hence it is decentralized. AI is an abbreviation of Adaptive Infrastructure. Another part not shown could be for example a computer system for a database coupled to the network. The type of each computer system is specified, in this case as a BL20/Xen. The slave application servers has an attribute "range=0 . . . n". This means the template allows any number of these slave application servers.

For each type of computer system, the model specifies the type of software services running on it, referred to as Execution Services 720, the internal structure of that service in terms of software application components such as the type of worker threads, referred to as Execution Components 710, and the deployment settings for the software that reference deployment instructions and parameters. The template describes the minimum, maximum and default values for modeled entities that can be replicated. The ranges for the performance parameters of these entities are encircled. Either a human or a service such as APE should decide specific values for performance parameters.

The Template Instantiation Service transforms a System Template Model with specific values for performance parameters into a System Model. The System Model has a separate object for each replicated instance of an entity whereas the System Template Model has only one instance with a range. This supports further management for each replicated instance.

The example of infrastructure design template in FIG. 15 has predetermined parts of the computing infrastructure, predetermined relationships between the parts, and a limited number of options to be completed. In this case it is suitable for a decentralised SD business process, without security or availability features which could appear in other examples of such templates.

At the execution services level, the master application server is coupled to a box labelled AI_GroundedExecutionService: 785, indicating it can be used to run such a software element. It has an associated AIDeploymentSetting box 788 which contains configuration information and deployment information sufficient to allow the AI_GroundedExecutionService to be automatically installed, deployed and managed. The AI_GroundedExecutionService: 780 is shown as containing a component, at the execution components level, labelled AI_GroundedExecutionComponent 760, and having an associated AIDeploymentSetting box 775. This component is a dialog work process, for executing the application components of steps of the service, such as those steps described below with reference to FIG. 16 for the example of a business process. Another component can be for example an update process, responsible for committing work to persistent storage, or an enqueue process, for managing locks on a database. As shown, the range attribute is 2 . . . n for the update and the dialog work process, meaning multiple instances of these parts are allowed.

The slave application server has a GroundedExecutionService 780 having only one type of AI_GroundedExecutionComponent 750 for any number of dialog work processes. The slave application service is shown having a rangePolicy=2 . . . n, meaning it is allowed to have any number of instances. Again the service and the execution component each have an associated AIDeploymentSetting box, 787 and 770 respectively.

The master and slave application servers have an operating system shown as AI_disk: OSDisk 810, 830. The master application server can have local storage for use by the application components. For the network, each computer system has a network interface shown as AI_Nic1, 800, 820 coupled to the network shown by AI_Network:subnet1.

The deployment settings can specify key value pairs for use by a deployment service. They can point to a specific deployment engine to be used, and settings to indicate where to access deployment packages and configuration parameters. Examples can be configuration parameters, how much memory is needed, where to find a given database if needed and so on.

Optionally the template can have commands to be invoked by the tools, when generating the grounded model, or generating a changed grounded model to change an existing grounded model. Such commands can be arranged to limit the options available, and can use as inputs, parts of the template specifying some of the infrastructure design. They can also use parts of the unbound model as inputs.

FIG. 16 Example of Service

FIG. 16 shows an example of service design in the form of a custom model of the well-known Sales and Distribution (SD) Benchmark. This is software produced by the well known German company SAP. It is part of the SAP R/3 system, which is a collection of software that performs standard business functions for corporations, such as manufacturing, accounting, financial management, and human resources. The SAP R/3 system is a client server system able to run on virtually any hardware/software platform and able to use many different database management systems. For example it can use an IBM AS/400 server running operating system OS/400 using database system DB2; or a Sun Solaris (a dialect of Unix) using an Oracle database system; or an IBM PC running Windows NT using SQL Server.

SAP R/3 is designed to allow customers to choose their own set of business functions, and to customize to add new database entities or new functionality. The SD Benchmark simulates many concurrent users using the SD (Sales and Distribution) application to assess the performance capabilities of hardware. For each user the interaction consists of 16 separate steps (Dialog Steps) that are repeated over and over. The steps and their mapping to SAP transactions are shown in FIG. 16. A transaction here is an example of an Application Component. Each transaction is shown as a number of boxes in a row. A first box in each row represents a user invoking the transaction e.g. by typing /nva01 to start transaction VA01. As shown in FIG. 10, transaction VA01 in the top row involves the business process steps of invoking the create sales order transaction, then filling order details, then saving the sold-to party, and completing with the "back" function F3 which saves the data.

A next transaction VL01N is shown in the second row, and involves steps as follows to create an outbound delivery. The transaction is invoked, shipping information is filled in, and saved. A next transaction VA03 is shown in the third row for displaying a customer sales order. This involves invoking the transaction, and filling subsequent documents. A fourth transaction is VL02N in the fourth row, for changing an outbound delivery. After invoking this transaction, the next box shows saving the outbound delivery. A next transaction shown in the fifth row is VA05, for listing sales orders. After invoking this transaction, the next box shows prompting the user to fill in dates and then a third box shows listing sales orders for the given dates. Finally, in a sixth row, the transaction VF01 is for creating a billing document, and shows filling a form and saving the filled form.

Above has been described examples of how to transition a Service Lifecycle Model from the general state through to the deployed state. It assumes customers are aware of their functional and non-functional requirements and automatically chooses an infrastructure design based on these requirements. The design is then transitioned into an on-line system for load testing or use by users.

A model-driven approach as described can be applied for packaging high value enterprise software for use as a service, for managing the service lifecycle of service instances, and for interacting with shared virtualized resource pools. The framework can target the hosting of very large numbers of service instances that may operate in resource pools supported by the cloud computing paradigm. It can support the customization of service instances by customers who do not need to have infrastructure design skills. Finally, it can address non-functional requirement issues such as availability, security, and performance that are important for high value customizable service instances.

Gathering information needed for the models employed can be part of the process. The configuration of a service instance can determine the tools used to support its service lifecycle management. Supplemental models can capture service specific information. As a result, the approach can be applied to many different kinds of services. In some embodiments model information is re-used and shared by a variety of tools that support lifecycle management. Tools can be used in combination to create powerful model transformations and state transitions.

The virtual machines and software components can be implemented using any conventional programming language, including languages such as Java, C, and compiled following established practice. The servers and network elements of the shared infrastructure can be implemented using conventional hardware with conventional processors. The processing elements need not be identical, but should be able to communicate with each other, e.g. by exchange of IP messages.

Other variations can be conceived within the scope of the claims.

The invention claimed is:

1. A system for automated lifecycle management of a computer implemented service, according to requirements, the system having a processor to implement:
   a service model arranged to represent at least part of the service at a given development state in the lifecycle,
   a transition model representing allowed operations to change the service model to a different one of the development states of the service, according to the requirements, and the transition model having a transparent structure suitable for automated inspection of the allowed operations, and suitable for automated adaptation of the allowed operations, and
   a service model state manager arranged to cause the service model to be developed to another of its states of development according to the allowed operations,
   the service model having an encoding of allowed operations associated with a given entity in the service model, and the system being arranged to check for inconsistency between the operations in the transition model relating to the given entity, and corresponding allowed operations encoded in the service model for the same entity.

2. The system of claim 1, the transition model also having a representation of how to adapt itself.

3. The system of claim 1, the transition model further comprising a representation of how to get the requirements for use in developing the service.

4. The system of claim 1 having one or more transition model tools arranged to analyse and adapt the allowed operations of the transition model according to the requirements.

5. The system of claim 1, the transition model having explicit encoding of execution constraints of the operations.

6. The system of claim 4, the transition model tools being arranged to add or include only allowed operations applicable to the requirements, or to remove allowed operations not applicable to the requirements.

7. The system of claim 4, the one or more transition model tools being arranged to adapt the transition model to fully populate the transition model at the outset of the lifecycle.

8. The system of claim 1, the processor further to implement a system model arrange to clone a service instance, wherein the clone operates in parallel with the service instance.

9. The system of claim 1, the transition model having allowed operations relating to more than one transition between the states, and an identification of which allowed operation relates to which transition.

10. The system of claim 1, the transition model having explicit identification of allowed transitions of the states and preconditions for allowing transitions.

11. The system of claim 1, the transition model having conditional statements to make the operations dependent on the requirements.

12. The system of claim 1, the service model having development states representing at least a design of the service, modelled configuration of software components to implement the service steps, and modelled infrastructure for running the software components.

13. The system of claim 1, arranged to deploy the service on shared virtualised infrastructure according to the service model.

14. A method of providing a computer implemented service using a system for automated lifecycle management of the service, according to requirements, the system having:
   a service model arranged to represent at least part of the service at a given development state in the lifecycle, the service model having an encoding of allowed operations associated with a given entity in the service model,
   a transition model representing allowed operations to change the service model to a different one of the development states of the service, according to the requirements, the transition model being arranged to be open to automated inspection of the allowed operations, and open to automated adaptation of the allowed operations, the method having the steps of:
      developing the service model to a deployable state using the allowed operations represented in the transition model,
      deploying the service according to the service model to make the service available to users, and
   causing a check for inconsistency between the operations in the transition model relating to the given entity, and corresponding allowed operations encoded in the service model for the same entity.

15. The method of claim 14 having the step of causing automated tools to inspect the transition model and check for errors.

16. The method of claim 14, having the steps of causing development of the service model through development states representing at least a design of the service, modelled configuration of software components to implement the service steps, and modelled infrastructure for running the software components.

17. The method of claim 14 having the steps of providing shared infrastructure for service providers to use for providing the service, allowing the service provider to input service requirements, and to cause the service model state manager to develop the service model to a deployable state using the allowed operations represented in the transition model, and allowing the service provider to deploy the service on the shared infrastructure according to the service model to make the service available to users.

18. A computer program stored on a non-transitory machine readable medium and arranged when executed, to carry out the steps of providing a computer implemented service and providing automated lifecycle management of the service, according to service requirements, the system having:

- a service model arranged to represent at least part of the service at a given development state in the lifecycle,
- a transition model representing allowed operations to change the service model to a different one of the development states of the service, according to the requirements, the transition model being arranged to be open to automated inspection of the allowed operations, and open to automated adaptation of the allowed operations,
- the service model having an encoding of allowed operations associated with a given entity in the service model, and the system being arranged to check for inconsistency between the operations in the transition model relating to the given entity, and the corresponding allowed operations encoded in the service model for the same entity, and
- the management of the service involving:
    - developing the service model to a deployable state using the allowed operations represented in the transition model, and
    - deploying the service according to the service model to make the service available to users.

19. The computer program of claim 18, the transition model also having a representation of how to adapt itself.

20. The system of claim 1, the system model further arranged to archive the service instance for later use.

* * * * *